(12) United States Patent
Danilovic

(10) Patent No.: US 11,843,258 B2
(45) Date of Patent: Dec. 12, 2023

(54) BIDIRECTIONAL OPERATION OF WIRELESS POWER SYSTEMS

(71) Applicant: WiTricity Corporation, Watertown, MA (US)

(72) Inventor: Milisav Danilovic, Watertown, MA (US)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 17/700,243

(22) Filed: Mar. 21, 2022

(65) Prior Publication Data
US 2022/0285994 A1 Sep. 8, 2022

Related U.S. Application Data

(63) Continuation of application No. 17/003,800, filed on Aug. 26, 2020, now Pat. No. 11,316,375.
(Continued)

(51) Int. Cl.
*H02J 50/12* (2016.01)
*H02M 3/335* (2006.01)
(Continued)

(52) U.S. Cl.
CPC ......... *H02J 50/12* (2016.02); *H02M 3/33592* (2013.01); *H02M 7/219* (2013.01); *H02M 7/53873* (2013.01)

(58) Field of Classification Search
CPC .... H02J 50/12; H02M 3/33592; H02M 7/219; H02M 7/53873; H02M 7/2195;
(Continued)

(56) References Cited

U.S. PATENT DOCUMENTS

| 5,640,082 A | 6/1997 | Lusher et al. |
| 5,757,599 A | 5/1998 | Crane |

(Continued)

FOREIGN PATENT DOCUMENTS

| CN | 103414255 A | 11/2013 |
| CN | 208094441 U | 11/2018 |

(Continued)

OTHER PUBLICATIONS

International Search Report and Written Opinion for PCT/US2020/048046 dated Oct. 8, 2020, 10 pages.
(Continued)

*Primary Examiner* — Rexford N Barnie
*Assistant Examiner* — Terrence R Willoughby
(74) *Attorney, Agent, or Firm* — Goodwin Procter LLP

(57) ABSTRACT

Described herein are active rectification methods and systems for a rectifier of a wireless power system. Exemplary methods can include detecting, by a zero-crossing detector, one or more zero-crossings of a current at an input of the rectifier and determining a first delay time based on at least one wireless power system parameter and the zero-crossings. The methods can include generating first and second control signals for first and second switches of the rectifier, respectively, based on the first delay time; inserting a first dead time between the first control signal and the second control signal; and providing the first and second control signals to the first and second switches, respectively.

20 Claims, 22 Drawing Sheets

Related U.S. Application Data

(60) Provisional application No. 62/891,959, filed on Aug. 26, 2019.

(51) Int. Cl.
 *H02M 7/219* (2006.01)
 *H02M 7/5387* (2007.01)

(58) Field of Classification Search
 CPC .............. H02M 1/081; H02M 3/33584; B60L 2210/30; B60L 2210/40; B60L 53/122; Y02T 10/7072; Y02T 10/70; Y02T 10/72; Y02T 90/14
 See application file for complete search history.

(56) References Cited

U.S. PATENT DOCUMENTS

| | | | |
|---|---|---|---|
| 5,784,269 A | 7/1998 | Jacobs et al. | |
| 6,037,745 A | 3/2000 | Koike et al. | |
| 6,483,730 B2 | 11/2002 | Johnson, Jr. | |
| 7,276,886 B2 | 10/2007 | Kinder et al. | |
| 7,333,349 B2 | 2/2008 | Chang et al. | |
| 7,440,300 B2 | 10/2008 | Konishi et al. | |
| 7,535,133 B2 | 5/2009 | Perreault et al. | |
| 8,830,710 B2 | 9/2014 | Perreault et al. | |
| 9,461,714 B2 | 10/2016 | Cook et al. | |
| 9,782,092 B2 | 10/2017 | Zhang | |
| 9,853,564 B2 | 12/2017 | Kang et al. | |
| 10,027,186 B2 | 7/2018 | Aikawa et al. | |
| 10,076,966 B2 | 9/2018 | Koizumi et al. | |
| 10,090,885 B2 | 10/2018 | Widmer et al. | |
| 10,141,788 B2 | 11/2018 | Karnstedt et al. | |
| 10,218,224 B2 | 2/2019 | Campanella et al. | |
| 10,343,535 B2 | 7/2019 | Cook et al. | |
| 10,418,841 B2 | 9/2019 | Danilovic et al. | |
| 10,461,587 B2 | 10/2019 | Sieber | |
| 10,651,688 B2 | 5/2020 | Karnstedt et al. | |
| 10,673,282 B2 | 6/2020 | Campanella et al. | |
| 11,017,942 B2 | 5/2021 | Rochford et al. | |
| 2003/0169027 A1 | 9/2003 | Croce et al. | |
| 2007/0064457 A1 | 3/2007 | Perreault et al. | |
| 2007/0222542 A1 | 9/2007 | Joannopoulos et al. | |
| 2008/0265995 A1 | 10/2008 | Okamoto et al. | |
| 2008/0278264 A1 | 11/2008 | Karalis et al. | |
| 2010/0141042 A1 | 6/2010 | Kesler et al. | |
| 2010/0237709 A1 | 9/2010 | Hall et al. | |
| 2010/0277006 A1 | 11/2010 | Urciuoli | |
| 2010/0295506 A1 | 11/2010 | Ichikawa | |
| 2011/0074346 A1 | 3/2011 | Hall et al. | |
| 2011/0116290 A1 | 5/2011 | Boys | |
| 2011/0193416 A1 | 8/2011 | Campanella et al. | |
| 2011/0196544 A1 | 8/2011 | Baarman et al. | |
| 2011/0254377 A1 | 10/2011 | Wildmer et al. | |
| 2011/0260865 A1 | 10/2011 | Bergman et al. | |
| 2012/0112535 A1 | 5/2012 | Karalis et al. | |
| 2012/0139358 A1 | 6/2012 | Teggatz et al. | |
| 2012/0287545 A1 | 11/2012 | Tran et al. | |
| 2013/0020863 A1 | 1/2013 | Sugiyama et al. | |
| 2013/0057200 A1* | 3/2013 | Potts .................. | H02M 7/4807 320/107 |
| 2013/0062966 A1 | 3/2013 | Verghese et al. | |
| 2013/0069441 A1 | 3/2013 | Verghese et al. | |
| 2013/0181724 A1 | 7/2013 | Teggatz et al. | |
| 2014/0035704 A1 | 2/2014 | Efe et al. | |
| 2014/0049118 A1 | 2/2014 | Karalis et al. | |
| 2014/0091634 A1 | 4/2014 | Mayo et al. | |
| 2014/0111019 A1 | 4/2014 | Roy et al. | |
| 2014/0152117 A1 | 6/2014 | Sankar | |
| 2014/0265610 A1 | 9/2014 | Bakker et al. | |
| 2014/0292092 A1 | 10/2014 | Ichinose et al. | |
| 2014/0361636 A1 | 12/2014 | Endo et al. | |
| 2014/0368052 A1 | 12/2014 | Norconk et al. | |
| 2015/0035372 A1 | 2/2015 | Aioanei | |
| 2015/0051750 A1 | 2/2015 | Kurs et al. | |
| 2015/0055262 A1 | 2/2015 | Lin | |
| 2015/0061578 A1 | 3/2015 | Keeling et al. | |
| 2015/0202970 A1 | 7/2015 | Huang et al. | |
| 2015/0244179 A1 | 8/2015 | Ritter et al. | |
| 2015/0260835 A1 | 9/2015 | Widmer et al. | |
| 2015/0303703 A1 | 10/2015 | Hayashi et al. | |
| 2015/0306963 A1 | 10/2015 | Van Wiemeersch et al. | |
| 2015/0318708 A1 | 11/2015 | Bartlett | |
| 2015/0319838 A1 | 11/2015 | Bhutta | |
| 2015/0323694 A1 | 11/2015 | Roy et al. | |
| 2015/0357826 A1 | 12/2015 | Yoo et al. | |
| 2015/0372516 A1 | 12/2015 | Na et al. | |
| 2016/0006289 A1 | 1/2016 | Sever et al. | |
| 2016/0079766 A1 | 3/2016 | Jeong et al. | |
| 2016/0084894 A1 | 3/2016 | Govindaraj et al. | |
| 2016/0187519 A1 | 6/2016 | Widmer et al. | |
| 2016/0218566 A1 | 7/2016 | Bunsen et al. | |
| 2016/0248243 A1 | 8/2016 | Yanagishima et al. | |
| 2016/0248275 A1 | 8/2016 | Okidan | |
| 2016/0254679 A1 | 9/2016 | Liu et al. | |
| 2016/0294221 A1 | 10/2016 | Maniktala | |
| 2016/0308393 A1 | 10/2016 | Kumar et al. | |
| 2016/0380555 A1 | 12/2016 | Kang et al. | |
| 2017/0093168 A1 | 3/2017 | Von Novak, III et al. | |
| 2017/0104365 A1 | 4/2017 | Ghosh et al. | |
| 2017/0117751 A1 | 4/2017 | Karnstedt et al. | |
| 2017/0126069 A1 | 5/2017 | Martin | |
| 2017/0141622 A1 | 5/2017 | Meichle | |
| 2017/0217325 A1 | 8/2017 | DeBaun et al. | |
| 2017/0229917 A1 | 8/2017 | Kurs et al. | |
| 2017/0256991 A1 | 9/2017 | Bronson et al. | |
| 2017/0324351 A1 | 11/2017 | Rochford | |
| 2017/0346343 A1 | 11/2017 | Atasoy et al. | |
| 2017/0346345 A1 | 11/2017 | Kurs et al. | |
| 2017/0358953 A1 | 12/2017 | Trudeau et al. | |
| 2018/0006566 A1 | 1/2018 | Bronson et al. | |
| 2018/0040416 A1 | 2/2018 | Lestoquoy | |
| 2018/0056800 A1 | 3/2018 | Meichle | |
| 2018/0062421 A1 | 3/2018 | Danilovic et al. | |
| 2018/0090993 A1 | 3/2018 | Markhi et al. | |
| 2018/0090995 A1 | 3/2018 | Arasaki et al. | |
| 2018/0191252 A1 | 7/2018 | Bianco et al. | |
| 2018/0236879 A1 | 8/2018 | Elshaer et al. | |
| 2018/0358844 A1 | 12/2018 | Yu et al. | |
| 2019/0006885 A1 | 1/2019 | Danilovic | |
| 2019/0006888 A1 | 1/2019 | Hajimiri et al. | |
| 2019/0103767 A1 | 4/2019 | Lethellier | |
| 2019/0103771 A1 | 4/2019 | Piasecki et al. | |
| 2019/0115837 A1 | 4/2019 | Fahlenkamp et al. | |
| 2019/0148986 A1 | 5/2019 | Yoo et al. | |
| 2019/0165611 A1 | 5/2019 | Miyazawa et al. | |
| 2019/0326743 A1 | 10/2019 | Govindaraj | |
| 2019/0341796 A1 | 11/2019 | Gu et al. | |
| 2020/0161901 A1 | 5/2020 | Tombelli | |
| 2020/0195164 A1 | 6/2020 | Zhan et al. | |
| 2020/0303926 A1 | 9/2020 | Yang | |
| 2020/0343715 A1 | 10/2020 | Kaeriyama | |
| 2020/0359468 A1 | 11/2020 | Jung et al. | |
| 2020/0381945 A1 | 12/2020 | Wang et al. | |
| 2021/0088567 A1 | 3/2021 | Guedon et al. | |
| 2021/0281099 A1 | 9/2021 | Wan | |
| 2021/0281112 A1 | 9/2021 | Danilovic et al. | |
| 2022/0255358 A1 | 8/2022 | Mao et al. | |

FOREIGN PATENT DOCUMENTS

| | | |
|---|---|---|
| CN | 109792164 A | 5/2019 |
| CN | 110103742 A | 8/2019 |
| DE | 102014208991 A1 | 11/2014 |
| EP | 0609964 A2 | 8/1994 |
| EP | 2763279 A1 | 8/2014 |
| EP | 2947749 A1 | 11/2015 |
| EP | 3145047 A1 | 3/2017 |
| EP | 3203634 A1 | 8/2017 |
| EP | 3248270 A1 | 11/2017 |
| EP | 3407467 A1 | 11/2018 |
| GB | 1506633 A | 4/1978 |
| JP | H11127580 A | 5/1999 |
| JP | 5635215 B1 | 12/2014 |

(56) References Cited

FOREIGN PATENT DOCUMENTS

| | | |
|---|---|---|
| JP | 2015208150 A | 11/2015 |
| JP | 2015231306 A | 12/2015 |
| JP | 2016131447 A | 7/2016 |
| JP | 2018102054 A | 6/2018 |
| KR | 20170118573 A | 10/2017 |
| WO | WO-2001018936 A1 | 3/2001 |
| WO | WO-2013036947 A2 | 3/2013 |
| WO | WO-2015119511 A1 | 8/2015 |
| WO | WO-2016099806 A1 | 6/2016 |
| WO | WO-2017070009 A1 | 4/2017 |
| WO | WO-2018136885 A1 | 7/2018 |

OTHER PUBLICATIONS

U.S. Appl. No. 16/882,117 11,489,332 Published as: US2020/0373768 A1, Protection Circuits for Wireless Power Receivers, filed May 22, 2020.

U.S. Appl. No. 16/882,136 Published as: US2020/0373752 A1, Protection Circuits for Wireless Power Receivers, filed May 22, 2020.

U.S. Appl. No. 16/671,828 11,017,942 Published as: US 2020-0143982 A1, Systems and Methods for Determining Coil Current in Wireless Power Systems, filed Nov. 1, 2019.

U.S. Appl. No. 16/698,317 11,159,055 Published as: US 2020-0177028 A1, Systems and Methods for Low Power Excitation in High Power Wireless Power Systems, filed Nov. 27, 2019.

U.S. Appl. No. 17/507,510 Published as: US 2022-0103017 A1, Systems and Methods for Low Power Excitation in High Power Wireless Power Systems, filed Oct. 21, 2021.

U.S. Appl. No. 17/556,309 Published as: US 2022-0115913 A1, Systems and Methods for Low Power Excitation in High Power Wireless Power Systems, filed Dec. 20, 2021.

U.S. Appl. No. 15/602,775 U.S. Pat. No. 10,804,742 Published as: US2017/0346343 A1, Voltage Regulation in Wireless Power Receivers, filed May 23, 2017.

U.S. Appl. No. 17/039,266 U.S. Pat. No. 11,349,342 Published as: US2021/0028652, Voltage Regulation in Wireless Power Receivers, filed Sep. 30, 2020.

U.S. Appl. No. 15/685,889 U.S. Pat. No. 10,418,841 Published as: US2018/0062421, Wireless Power Systems Having Interleaved Rectifiers, filed Aug. 24, 2017.

U.S. Appl. No. 16/543,090 U.S. Pat. No. 10,707,693 Published as: US2020/0044477, Wireless Power Systems Having Interleaved Rectifiers, filed Aug. 16, 2019.

U.S. Appl. No. 17/003,800 U.S. Pat. No. 11,316,375 Published as: US2021/0066968, Control of Active Rectification in Wireless Power Systems, filed Aug. 26, 2020.

U.S. Appl. No. 17/161,479 Published as: US 2021-0234365 A1, Systems and Methods for Auxiliary Power Dropout Protection, filed Jan. 28, 2021.

U.S. Appl. No. 17/161,487 Published as: US 2021-0234366 A1, Gate Driver Implementations for Safe Wireless Power System Operation, filed Jan. 28, 2021.

U.S. Appl. No. 17/155,855 U.S. Pat. No. 11,356,079 Published as: US 2021-0234534 A1, Tunable Reactance Circuits for Wireless Power Systems, filed Jan. 22, 2021.

U.S. Appl. No. 17/194,089 Published as:, Active Rectification in Wireless Power Systems, filed Mar. 5, 2021.

U.S. Appl. No. 17/194,082 Published as: US 2021-0297004-A1, Active Rectification in Wireless Power Systems, filed Mar. 5, 2021.

U.S. Appl. No. 17/991,661, Active Rectification in Wireless Power Systems. filed Nov. 21, 2022.

U.S. Appl. No. 17/853,061, Systems and Methods for Pairing Wireless Power Transmitters and Receivers, filed Jun. 29, 2022.

U.S. Appl. No. 17/943,990, Systems and Methods for Pairing Wireless Power Receivers and Transmitters, filed Sep. 13, 2022.

International Search Report and Written Opinion for PCT/US2020/048046 dated Oct. 8, 2020.

International Search Report—International Application No. PCT/US2017/048481, dated Dec. 6, 2017, together with the Written Opinion of the International Searching Authority, 11 pages.

International Search Report—International Application No. PCT/US2021/021209, dated Aug. 17, 2021, together with the Written Opinion of the International Searching Authority, 17 pages.

International Search Report and the Written Opinion of the International Searching Authority, PCT/US2017/033997, 9 pages, dated Sep. 12, 2017.

International Search Report and Written Opinion for PCT/US2019/059441 dated Feb. 18, 2020, 11 pages.

International Search Report and Written Opinion for PCT/US2019/063616 dated Mar. 11, 2020, 9 pages.

International Search Report and Written Opinion for PCT/US2020/034344 dated Oct. 28, 2020, 15 pages.

International Search Report—International Application No. PCT/US2017/054055 dated Dec. 21, 2017, together with the Written Opinion of the International Searching Authority, 12 pages.

Rivas, et al., Design Considerations for Very High Frequency dc-dc Converters, 37th IEEE Power Electronics Specialists Conference, Jun. 18-22, 2006, 11 pages, Jeju, Korea.

Rivas, et al., New Architectures for Radio-Frequency dc/dc Power Conversion, 2004 35th Annual IEEE Power Electronics Specialists Conference, 2004, 11 pages, Aachen, Germany.

* cited by examiner

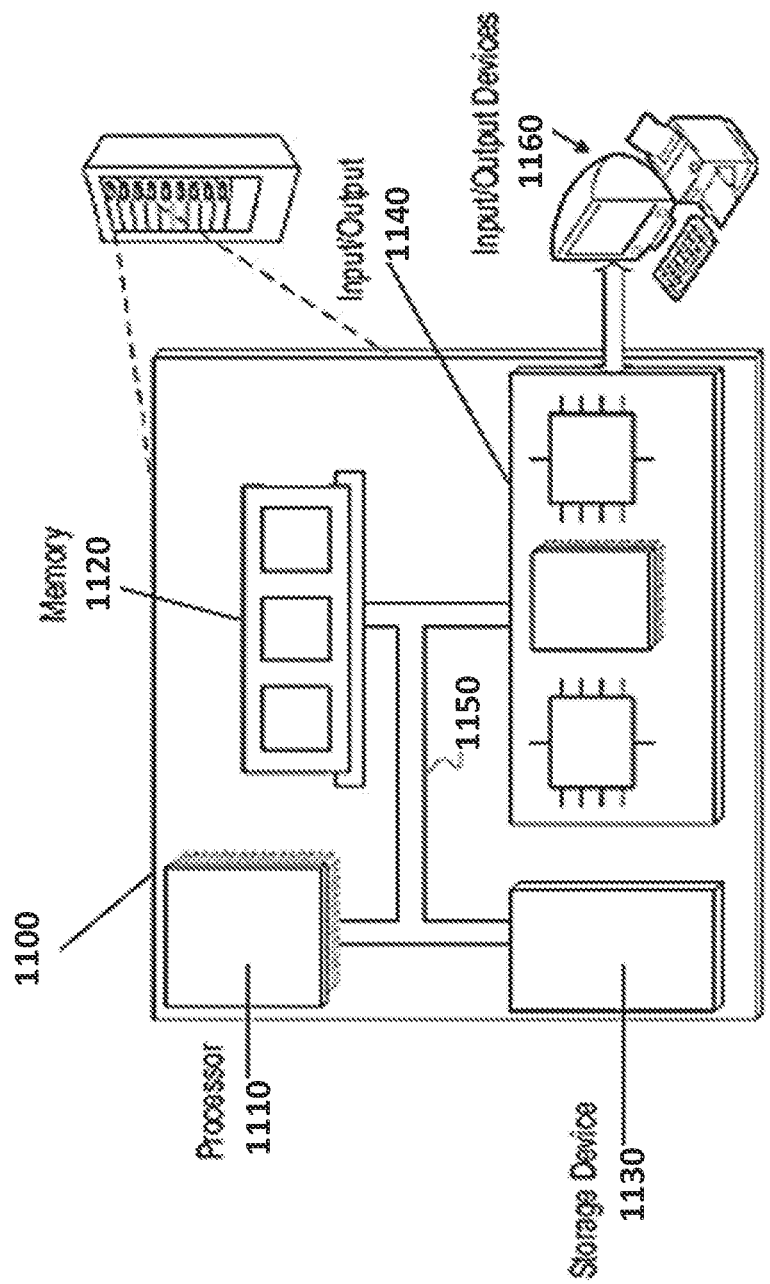

BIDIRECTIONAL OPERATION OF WIRELESS POWER SYSTEMS

CROSS-REFERENCE TO RELATED APPLICATIONS

This application is a continuation of U.S. patent application Ser. No. 17/003,800 titled "CONTROL OF ACTIVE RECTIFICATION IN WIRELESS POWER SYSTEMS" and filed on Aug. 26, 2020, which claims priority to and the benefit of U.S. Provisional Patent Application No. 62/891,959 titled "CONTROL OF ACTIVE RECTIFIER SWITCHES IN WIRELESS POWER SYSTEMS" and filed on Aug. 26, 2019, the entire contents of each of which are hereby incorporated by reference herein.

TECHNICAL FIELD

The following disclosure is directed to active rectification methods and systems in wireless power systems and, more specifically, control of active rectification methods and systems in wireless power receivers.

BACKGROUND

Wireless power systems are configured to transmit power to a load (e.g., a battery of an electrical device) without mechanical contact between the transmitter and receiver. Wireless power receivers of such systems generally include a rectifier to convert oscillating energy to DC for delivery to a load (e.g., a battery) coupled to the receiver. It can be beneficial for the rectifier to operate with high efficiency.

SUMMARY

Disclosed herein are active rectification control methods for wireless power systems.

In one aspect, the disclosure features an active rectification method for a rectifier of a wireless power system. The method can include detecting, by a zero-crossing detector, one or more zero-crossings of a current at an input of the rectifier; and determining a first delay time based on at least one wireless power system parameter and the zero-crossings. The method can further include generating first and second control signals for first and second switches of the rectifier, respectively, based on the first delay time; inserting a first dead time between the first control signal and the second control signal; and providing the first and second control signals to the first and second switches, respectively.

Various embodiments of the active rectification method can include one or more of the following features. The method can include determining a second delay time based on the wireless power system parameter and the zero-crossings; generating third and fourth control signals for third and fourth switches of the rectifier, respectively, based on the second delay time; inserting a second dead time between the third control signal and the fourth control signal; and providing the third and fourth control signals to the third and fourth rectifier switches, respectively. The third and fourth switches can be coupled to the first and second switches in a full-bridge configuration. The rectifier can be part of a wireless power receiver. The rectifier can be part of a wireless power transmitter.

The rectifier can include two diodes coupled in a full-bridge rectifier configuration with the first and second switches. The first and second switches can be low-side switches of the rectifier. The first and second switches can be coupled to a first rectifier input and the two diodes are coupled to a second rectifier input. The first delay time can be determined by a delay block operably coupled to the zero-crossing detector. The zero-crossings can include a first zero-crossing corresponding to a rise in the current and a second zero-crossing corresponding to a fall in the current. A value of the at least one wireless power system parameter can be based on at least one of: (i) an impedance of the rectifier; (ii) a power level transmitted to a load coupled to the wireless power system; or (iii) a coil current of a wireless power receiver comprising the rectifier.

In another aspect, the disclosure features an active rectification system for a wireless power system. The system can include a first switch and a second switch coupled between a source of oscillating current and a battery of the wireless power system; and a control system coupled to each of the first switch and the second switch. The control system can be configured to: detect one or more zero-crossings of the oscillating current at an input of the rectifier; and determine a first delay time based on at least one wireless power system parameter and the zero-crossings. The control system can be further configured to: generate first and second control signals for the first and second switches of the rectifier, respectively, based on the first delay time; insert a first dead time between the first control signal and the second control signal; and provide the first and second control signals to the first and second switches, respectively.

Various embodiments of the active rectification system can include one or more of the following features. The system can include a third switch and a fourth switch coupled between the source of oscillating current and the battery of the wireless power system. The control system can be further configured to: determine a second delay time based on the wireless power system parameter and the zero-crossings and generate third and fourth control signals for third and fourth switches of the rectifier, respectively, based on the second delay time. The control system can be further configured to insert a second dead time between the third control signal and the fourth control signal; and provide the third and fourth control signals to the third and fourth rectifier switches, respectively. The third and fourth switches can be coupled to the first and second switches is a full-bridge configuration.

The rectifier can be part of a wireless power receiver. The rectifier can be part of a wireless power transmitter. The rectifier can include two diodes coupled in a full-bridge rectifier configuration with the first and second switches. The first and second switches can be low-side switches of the rectifier. A value of the at least one wireless power system parameter can be based on at least one of: (i) an impedance of the rectifier; (ii) a power level transmitted to the battery coupled to the wireless power system; or (iii) a coil current of a wireless power receiver comprising the rectifier.

In another aspect, the disclosure features an active rectification method for a wireless power system. The method can include detecting, by a zero-crossing detector, one or more zero-crossings of a current at an input of the rectifier; generating a phase lock loop (PLL) signal based on the rising zero-crossing and falling zero-crossing; determining a first delay time based on at least one wireless power system parameter and the zero-crossings; generating first and second control signals for first and second switches of the rectifier, respectively, based on the first delay time and PLL signal; inserting a first dead time between the first control signal and the second control signal; and providing the first and second control signals to the first and second switches, respectively.

In another aspect, the disclosure features an active rectification method for a wireless power system. The method can include receiving and/or filtering a current at an input of the rectifier; detecting, by a zero-crossing detector, one or more zero-crossings of a current at an input of the rectifier; determining a first delay time based on at least one wireless power system parameter and the zero-crossings; generating first and second control signals for first and second switches of the rectifier, respectively, based on the first delay time; inserting a first dead time between the first control signal and the second control signal; and providing the first and second control signals to the first and second switches, respectively.

In another aspect, the disclosure features an active rectification method for a wireless power system. The method can include detecting, by a zero-crossing detector, one or more zero-crossings of a current at an input of the rectifier; generating a phase lock loop (PLL) signal based on the rising zero-crossing and falling zero-crossing; determining a first voltage signal based on one or more wireless power system parameters; generating first and second control signals for first and second switches of the rectifier, respectively, based on the PLL signal and the first voltage signal; inserting a first dead time between the first control signal and the second control signal; and providing the first and second control signals to the first and second switches, respectively.

BRIEF DESCRIPTION OF THE DRAWINGS

FIG. 11 is a block diagram of an example computer system that may be used in implementing the active rectification systems and methods described herein.

DETAILED DESCRIPTION

Disclosed herein are exemplary embodiments of active rectification systems and methods in wireless power systems. Specifically, active rectification can be used in wireless power receivers. Active rectification employs actively controlled switches coupled so as to form a rectifier. Switches can include transistors (e.g., FETs, MOSFETs, BJTs, IGBTs, etc.). In an exemplary wireless power system, an active rectifier can be used to convert oscillating current (AC) received at the wireless power receiver to direct current (DC), which can be used to ultimately transfer energy to a load, as described further below. Details of illustrative embodiments are discussed below.

Wireless Power System Overview

Figure 1:
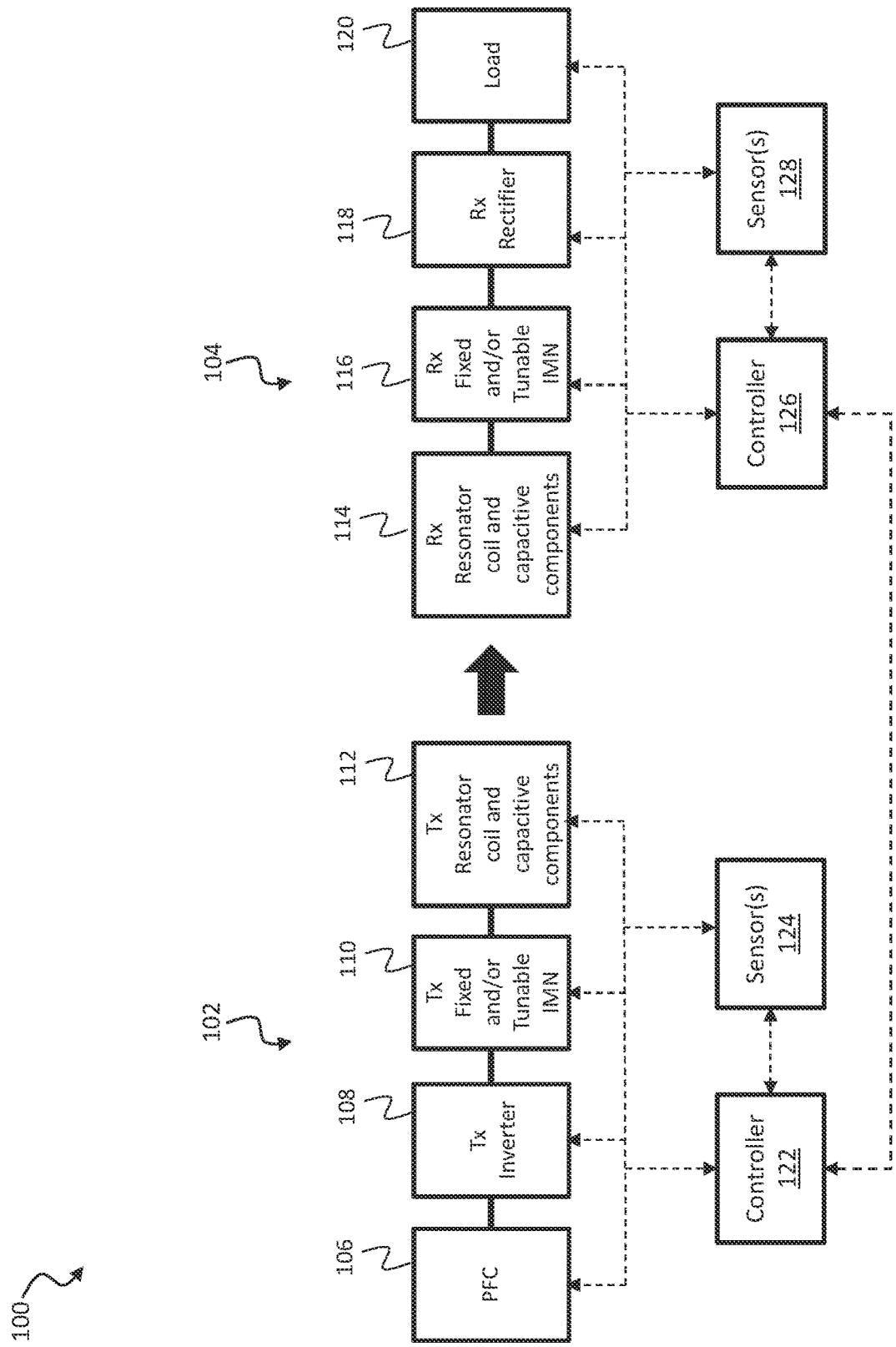
FIG. 1 is a block diagram of an exemplary wireless power system.

FIG. 1 is a block diagram of an exemplary wireless power system 100. The system 100 includes a wireless power transmitter 102 and a wireless power receiver 104. In transmitter 104, a power source (e.g., AC mains, battery, etc.) provides power to an inverter 108. Additional components can include power factor correction (PFC) circuit 106 before the inverter stage 108. The inverter 108 drives the transmitter resonator coil and capacitive components 112 ("resonator"), via an impedance matching network 110 (including fixed and/or tunable network components). The transmitter resonator 112 produces an oscillating magnetic field which induces a voltage and/or current in receiver resonator 114. The received energy is provided to a rectifier 118 via impedance matching network 116 (including fixed and/or tunable network components). Ultimately, the rectified power is provided to a load 120 (e.g., one or more batteries of an electric or hybrid vehicle). In some embodiments, the battery voltage level can impact various parameters (e.g., impedance) of the wireless power system 100. Therefore, the battery voltage level may be received, determined, or measured to be provided as input to other portions of the wireless power system 100. For example, typical battery voltage ranges for electric vehicles include 200-280 V, 200-350 V, 200-420 V, etc.

In some embodiments, one or more components of the transmitter 102 can be coupled to a controller 122, which may include a communication module (e.g., Wi-Fi, radio, Bluetooth, in-band signaling mechanism, etc.) configured to communicate with a communication module of receiver 104. In some embodiments, one or more components of the transmitter 102 can be coupled to one or more sensors 124 (e.g., a current sensor, a voltage sensor, a power sensor, a temperature sensor, a fault sensor, etc.). The controller 122 and sensor(s) 124 can be operably coupled to control portions of the transmitter 102 based on feedback signals from the sensor(s) 124 and/or sensor(s) 128.

In some embodiments, one or more components of the receiver 104 can be coupled to a controller 126, which may include a communication module (e.g., Wi-Fi, radio, Bluetooth, in-band signaling mechanism, etc.) configured to communicate with a communication module of transmitter 102. In some embodiments, one or more components of the transmitter 104 can be coupled to one or more sensors 128 (e.g., a current sensor, a voltage sensor, a power sensor, a temperature sensor, a fault sensor, etc.). The controller 126 and sensor(s) 128 can be operably coupled to control portions of the transmitter 102 based on feedback signals from the sensor(s) 128 and/or sensor(s) 124.

Examples of wireless power systems can be found in U.S. Patent Application Publication No. 2010/0141042, published Jun. 10, 2010 and titled "Wireless energy transfer systems," and U.S. Patent Application Publication No. 2012/0112535, published May 10, 2012 and titled "Wireless energy transfer for vehicles," both of which are hereby incorporated by reference in their entireties.

The exemplary systems and methods disclosed herein may be described with respect to a vehicle application but can also be applied to any system or apparatus powered by electricity, e.g., robots, industrial machines, appliances, consumer electronics, etc. High-power wireless power transmitters can be configured to transmit wireless power in applications such as powering of and/or charging a battery of vehicles, industrial machines, robots, or electronic devices relying on high power. For the purpose of illustration, the following disclosure focuses on wireless power transmission for vehicles. However, it is understood that any one or more of the embodiments described herein can be applied to other applications in which wireless power can be utilized.

As used herein, the term "capacitor", or the symbol therefor, can refer to one or more electrical components having a capacitance (e.g., in Farads) and/or capacitive reactance (e.g., in Ohms). For example, a capacitor may refer to one or more capacitors (e.g., in a "bank" of capacitors) that may be on the order of tens, hundreds, etc. of discrete capacitors. Two or more capacitors may be coupled in series or parallel to attain the desired capacitance and/or desired capacitive reactance. Note that capacitive reactance may be expressed as a negative value herein. However, one skilled in the art would recognize that, in some conventions, capacitive reactance may also be expressed as a positive value.

As used herein, the term "inductor", or the symbol therefor, can refer to one or more electrical components having a inductance (e.g., in Henries) and/or inductive reactance (e.g., in Ohms). For example, an inductor may refer to one or more discrete inductors or coils. Two or more inductors may be coupled in series or parallel to attain a desired inductance and/or desired inductive reactance. Note that inductive reactance may be expressed as a positive value herein.

While the disclosure, including the Figures, may provide exemplary values for the various electrical components, it is understood that the value of the components can be customized for the particular application. For example, the value of various electronic components can depend whether the wireless power transmitter is used to transmit power for charging a vehicle battery (on the order of thousands of Watts) or a cell phone battery (typically less than 5 Watts).

Active Rectification in Wireless Power Receivers

In some embodiments, active rectification can enable a greater degree of control over power transmission to the output of the receiver 104 and/or load 120. In some embodiments, active rectification can enable more efficient power transmission to the output of the receiver 104 and/or load 120. In some embodiments, by employing active rectification in a wireless power receiver, the tunable impedance matching components in the receiver 104 and/or transmitter 102 can be eliminated. This can have the benefit of reducing the size, weight, and/or cost associated with the wireless power system.

Figure 2A:
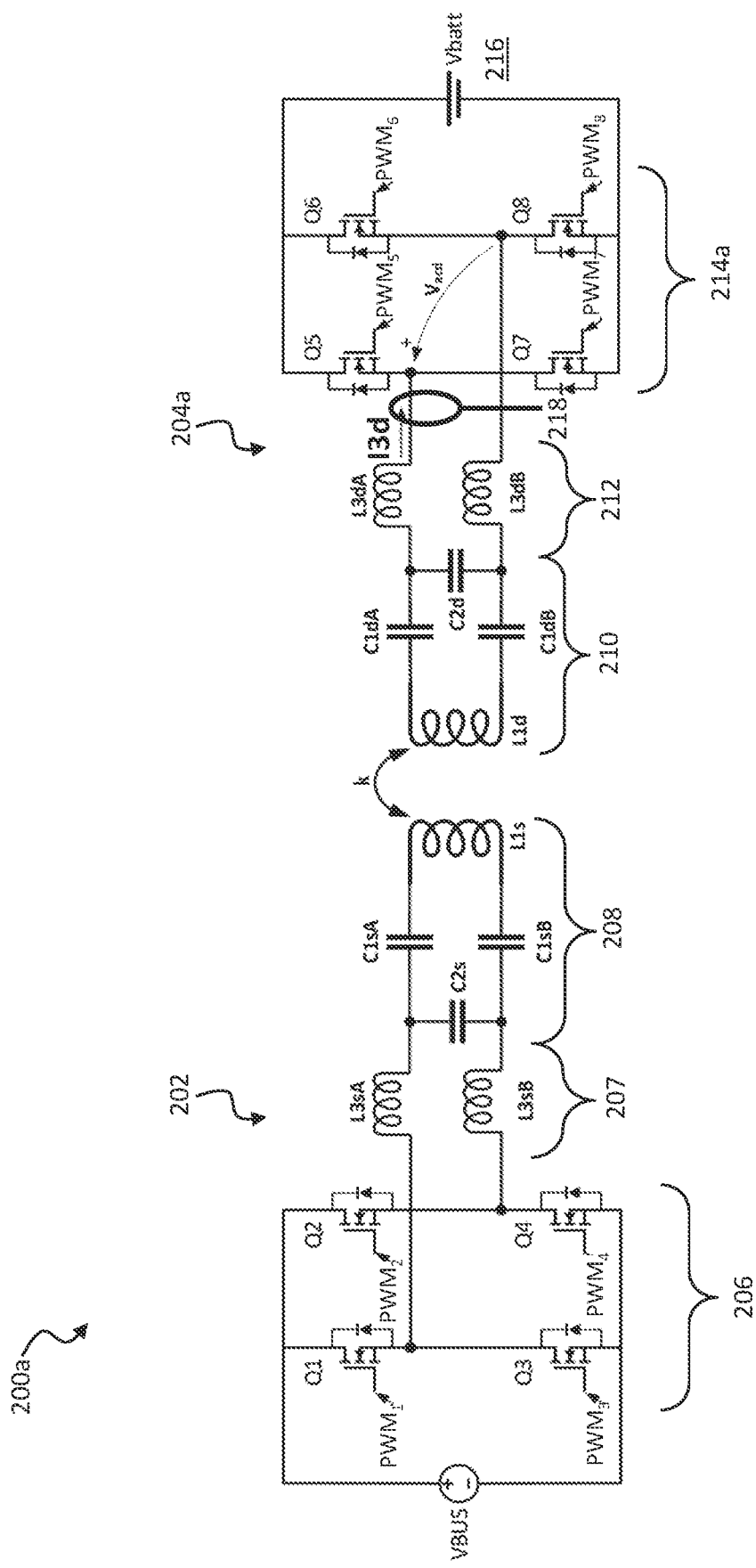
FIG. 2A is a schematic of an exemplary wireless power system employing active rectification.

FIG. 2A is a schematic of an exemplary wireless power system 200 leveraging active rectification. The exemplary system 200 includes a wireless power transmitter 202. The exemplary transmitter 202 includes an inverter 206 (e.g., a half-bridge inverter, a full-bridge inverter, etc.) coupled to a filter circuit 207 (which can include, e.g., one or more inductive components L3sA, L3sB, one or more capacitive components, etc.). The inverter 206 can include two or more switches (e.g., transistors Q1, Q2, Q3, and Q4). The switches Q1, Q2, Q3, Q4 can be controlled via respective control signals PWM1, PWM2, PWM3, PWM4. The filter 207 can be further coupled to a transmitting resonator and/or matching circuit 208 (including capacitors C2s, C1sA, C1sB, and inductor L1s), as described above.

In exemplary system 200, the inductor L1s of circuit 208 can be inductively coupled to the inductor L1d of receiving resonator and/or matching circuit 210 (including capacitors C1dA, C1dB, C2d, and inductor L1d) so as to wirelessly transmit power from the transmitter 202 to the receiver 204a. Note that the transmitter coil L1s generates an oscillating magnetic field, which can induce an oscillating current at the receiver coil L1d. This current can have a frequency of, for example, 85 kHz. In many instances, the current I3d can include harmonics due to the inverter 206. In some embodiments, characteristics (e.g., phase, amplitude, shape, harmonic content, etc.) of the current I3d can be further influenced (e.g., shaped, distorted, etc.) by one or more components of the receiver 204a. For example, circuits 210 and 212 can include inductive and/or capacitive components that can alter the phase or shape of the current I3d. In some cases, the distortions of the current I3d can create challenges in operating the rectifier switches, as described further below.

The exemplary receiver 204a can include filter circuit 212 (including, e.g., one or more inductive components L3dA, L3dB, one or more capacitive components, etc.) coupled to the receiving resonator and/or matching circuit 210. The filter circuit 212 can be configured to change characteristics (e.g., reduce distortions) of the current I3d.

The filter circuit 212 can be coupled to the rectifier 214a (e.g., a half-bridge inverter, a full-bridge inverter, etc.), which can include two or more switches (e.g., transistors Q5, Q6, Q7, and Q8). The exemplary rectifier 214a can be coupled directly or indirectly to a load 216 (e.g., a battery). In some embodiments, a current sensor 218 can determine (e.g., measure, sense, etc.) the characteristics of the current I3d. The current sensor 218 can be coupled at the output of the filter 212 and/or input of the rectifier 214. For example, the current sensor 218 may determine the phase of the current I3d at the input of the rectifier 214. The sensor signal may be provided to a processor and/or controller (e.g., controller 126) for processing. In some embodiments, the processor and/or controller may generate control signals (e.g., PWM signals) for controlling one or more switches of the rectifier 214 based on the current sensor 218 signal(s). The processor and/or controller can provide the control signals (e.g., PWM5, PWM6, PWM7, PWM8) to one or more switches (e.g., Q5, Q6, Q7, Q8, respectively) of the rectifier 214. In some embodiments, the current sensor 218 can include a zero-crossing detector configured to detect zero-crossings by the current I3d, as described in further detail below. The detector signal may be provided to the controller to determining the control signals for the switches.

In some embodiments, the control signals may cause the rectifier switches to operate in various modes. The modes can include hard switching and/or soft switching (e.g., zero voltage switching). In some embodiments, the rectifier switches can operate in one mode during a first time period and operate in another mode during a second time period. In some cases, the switches may alternate or transition between two modes during a given time period.

The following non-limiting exemplary wireless power system 200 specifications are referenced herein:
  The transmitter coil L1s can be disposed on a single or multiple layers of ferrite.
  The system 200 is configured to deliver approximately 11.3 kW of power to the load 216.
  The receiver coil L1d can have 15 or less turns, 20 or less turns, 25 or less turns, etc. (e.g., approximately 16 turns).
  The matching can be configured for a voltage range Vbus=300-900 V (e.g., 640-840 V).

Figures 2B, 2C:
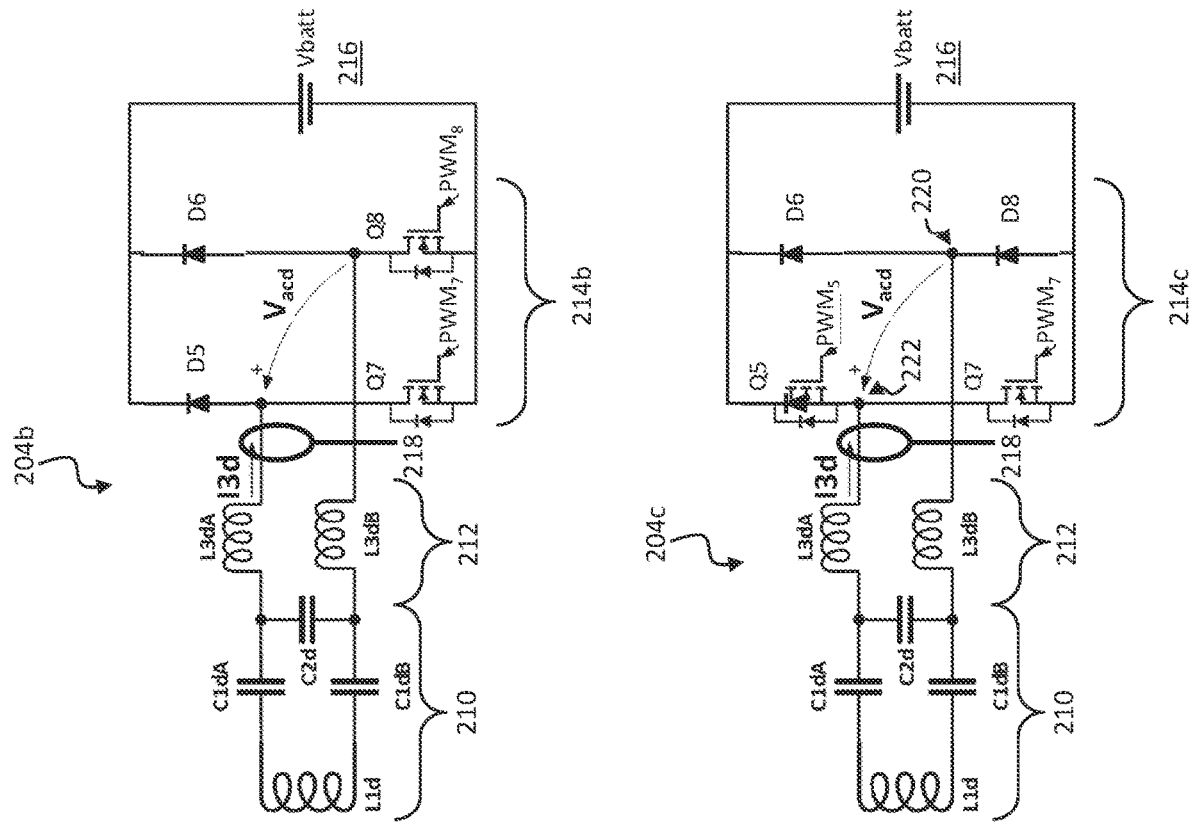
FIGS. 2B-2C are schematics of exemplary wireless power receivers employing active rectification.

FIG. 2B illustrates an alternative embodiment of a wireless power receiver 204b including an active rectifier 214b. Receiver 204b includes the same or similar components described herein for receiver 204a. However, the rectifier 214b is a full-bridge active rectifier having diodes D5, D6 in the high-side positions and switches Q7, Q8 in the low-side positions.

FIG. 2C illustrates another alternative embodiment of a wireless power receiver 204c including an active rectifier 214c. Receiver 204c includes the same or similar components described herein for receiver 204a. However, the rectifier 214c is a full-bridge active rectifier having (i) diodes D6, D8 coupled between input node 220 and the output of the rectifier 214c and (ii) switches Q5, Q7 coupled between input node 222 and the output of the rectifier 214c. In an alternative embodiment, an active rectifier can be a full-bridge active rectifier having switches Q6, Q8 (replacing diodes D6, D8 in FIG. 2C) coupled between input node 220 and the output of the rectifier and (ii) diodes D5, D7 (replacing switches Q5, Q7 illustrated in FIG. 2C) coupled between input node 222 and the output of the rectifier. Note that one or more of the following methods can be used to control the switches of rectifier 214a, 214b, or 214c.

First Exemplary Method—Resistive Input Impedance

Figure 3A:
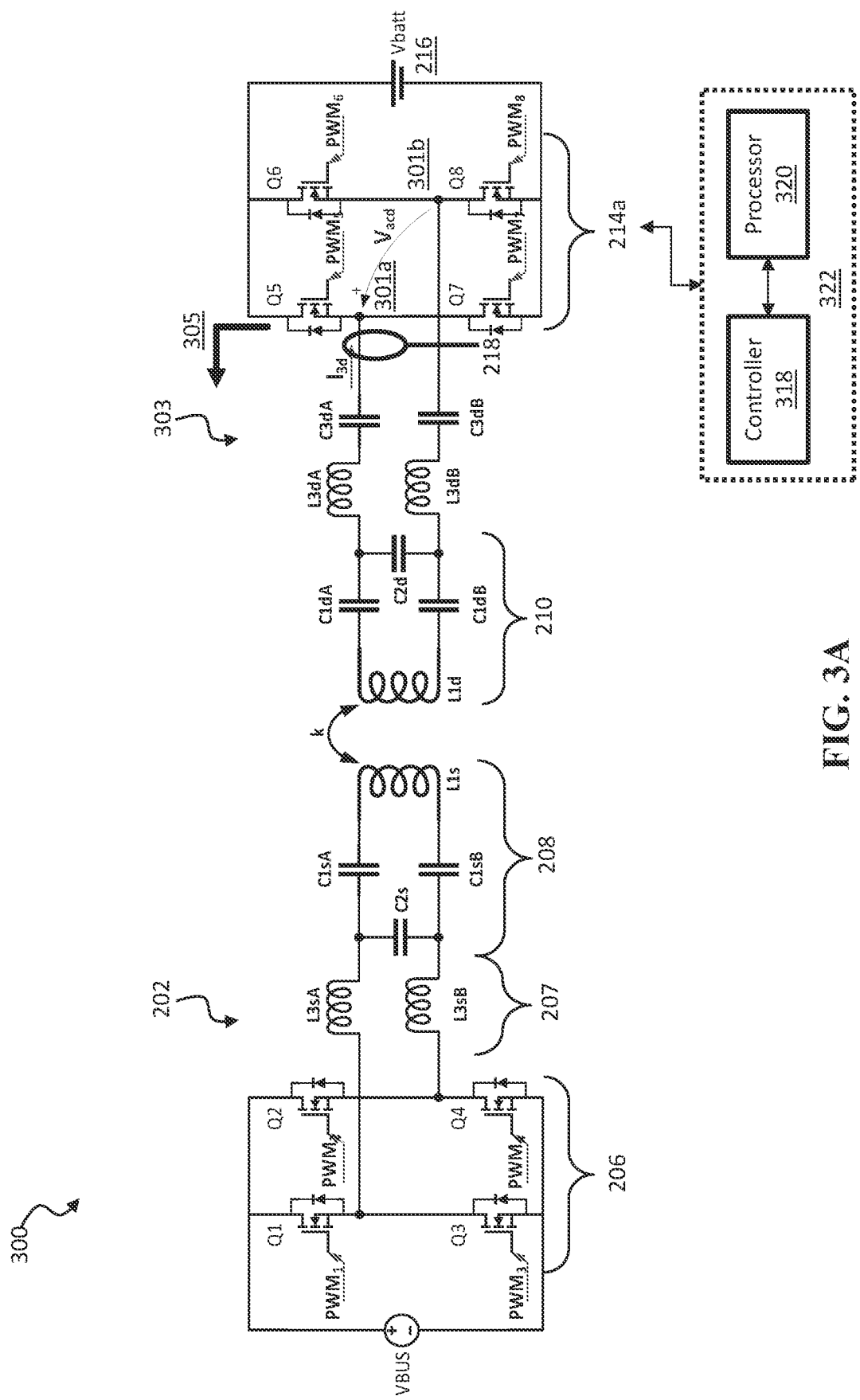
FIG. 3A is a schematic of an exemplary wireless power system employing active rectification.

FIG. 3A is a schematic of an exemplary wireless power system 300 utilizing active rectification. Note that the system 300 can include components of system 200 (e.g., rectifier 214a, 214b, or 214c) as discussed above. In some embodiments, system 300 can include a receiver 303 having one or more capacitors C3dA coupled between inductor L3dA and a first input 301a of the rectifier 214a and one or more capacitors C3dB coupled between L3dB and a second input 301b of the rectifier 214a.

Figure 3B:
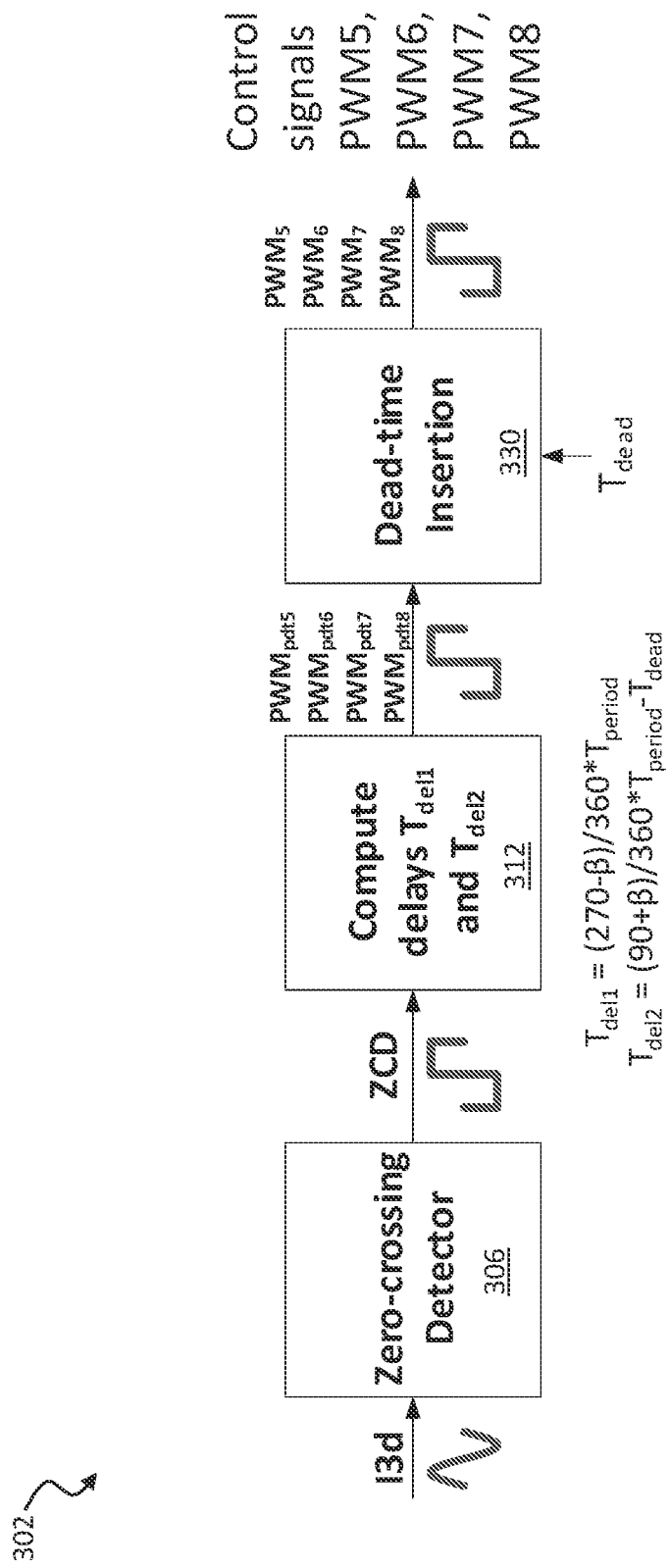
FIG. 3B is a diagram of an exemplary workflow for determining control signals for rectifier switches based on the input current.
Figure 3C:
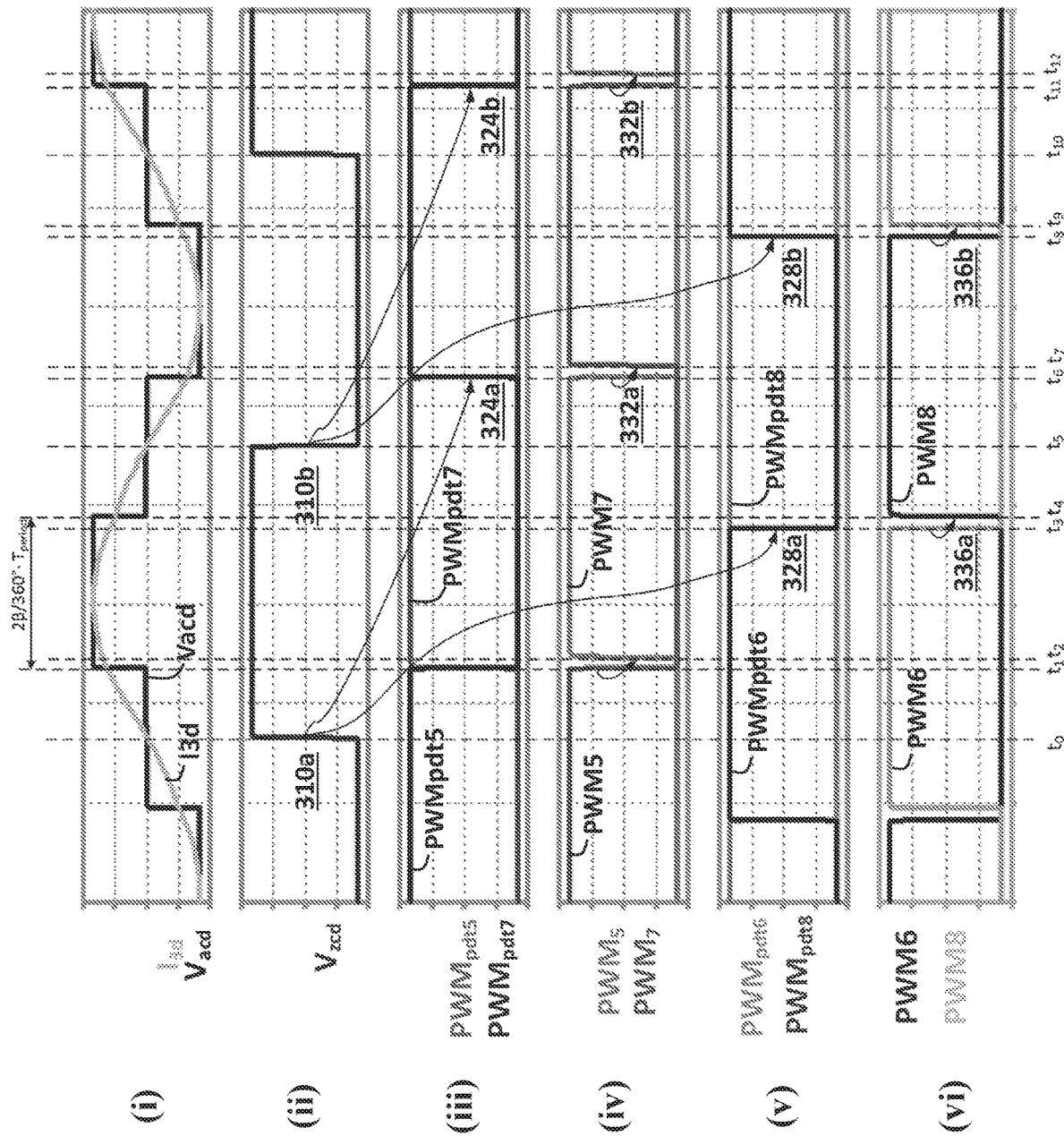
FIG. 3C is a set of plots illustrating various signals in the generation of the control signals as a function of time.
Figure 3D:
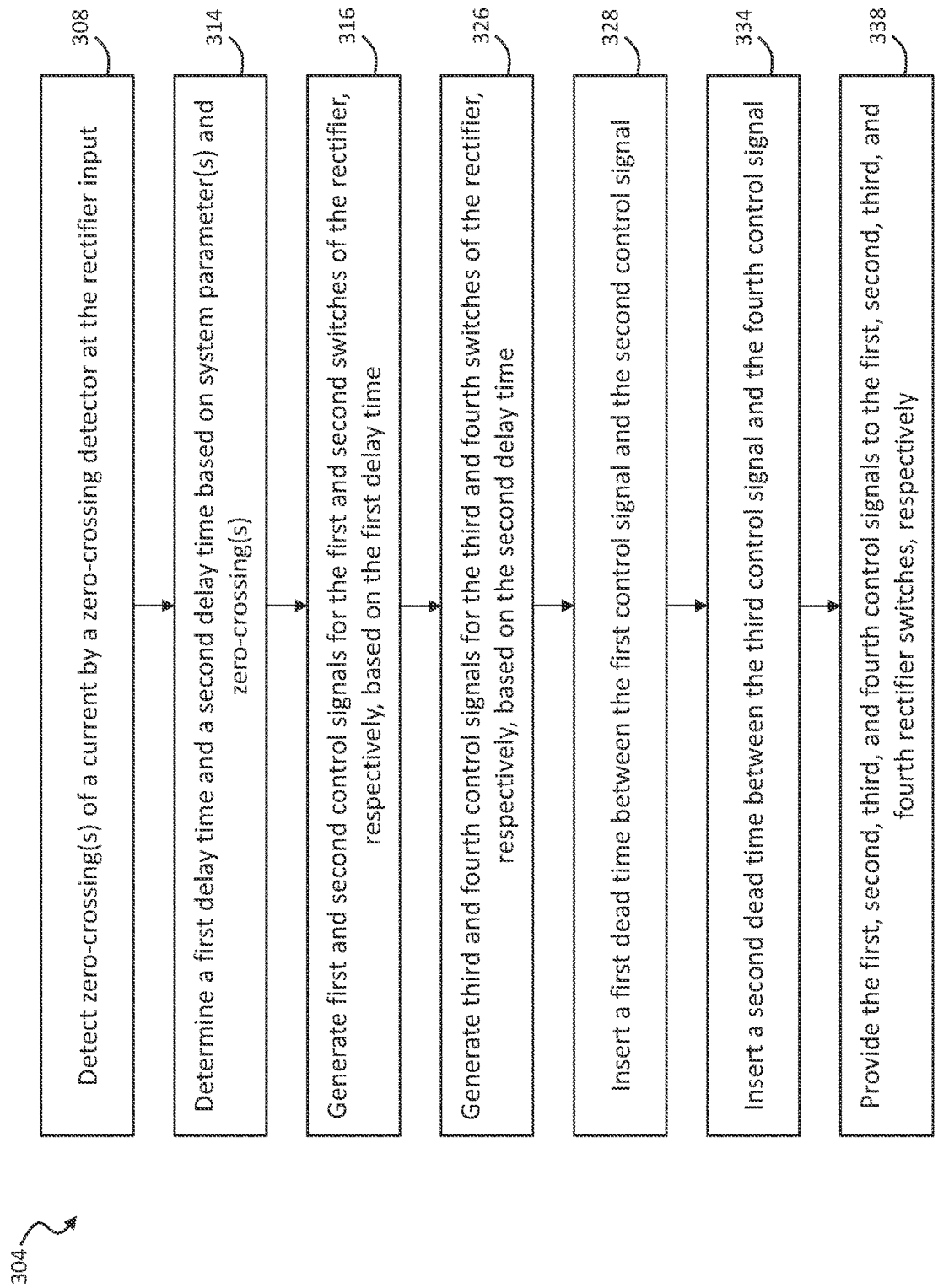
FIG. 3D is a flowchart of an exemplary method for rectifier switch control in a wireless power system.

FIG. 3B illustrates an exemplary workflow 302 corresponding to exemplary method for determining the control signals (e.g., PWM5, PWM6, PWM7, PWM8) for the rectifier switches (e.g., Q5, Q6, Q7, Q8, respectively) based on the input current I3d. FIG. 3C is a set of plots illustrating various signals in the generation of the control signals as a function of time. FIG. 3D illustrates an exemplary method 304 for determining control signals for active rectification in a rectifier presenting a resistive impedance to one or more portions of the wireless power system (e.g., the transmitter 202, components between Vbus and arrow 305, etc.). For the sake of clarity and conciseness, FIGS. 3A-3D are discussed together herein.

Referring to FIG. 3B, the current I3d can be inputted to zero-crossing detector 306 (e.g., of control system 322). An exemplary current I3d is provided in FIG. 3C(i). In step 308 of exemplary active rectification method 304, the detector 306 is configured to detect the zero-crossing(s) of the input current I3d. Referring to FIG. 3C(ii), the detector 306 can output a zero-crossing detection signal Vzcd indicating the zero-crossings of current signal I3d. For example, the current I3d has a rising zero-crossing at time t0 and a falling zero-crossing at time t5. Zero-crossing information can be used to synchronize switching patterns of Q5, Q6, Q7, and/or Q8 switches to the I3d current zero-crossings, as illustrated in FIG. 3C(iii) and FIG. 3C(v). In particular, the rising edge 310a (at time t0) and falling edge 310b (at time t5) of signal Vzcd can be used to time the switching signals $PWM_{pdt5}$ and $PWM_{pdt7}$ (as illustrated in FIG. 3C(iii)) and the switching signals $PWM_{pdt6}$ and $PWM_{pdt8}$ (as illustrated in FIG. 3C(v)).

The signal having the zero-crossing information (e.g., voltage Vzcd) can be provided to a delay block 312 (e.g., of control system 322). In step 314, the delay block 312 can determine a first delay time $T_{del1}$ and a second delay time $T_{del2}$ based on system parameter(s) (e.g., β, as described further below). The exemplary delay block 312 may be configured to provide one or more time delays according to the following relationships:

Time delay 1:
$$T_{del1} = (270 - \beta)/360 * T_{period}$$

Time delay 2:
$$T_{del2} = (90 + \beta)/360 * T_{period} - T_{dead}$$

where $0 \leq \beta \leq 90°$, $T_{period}$ is a single period in time of the input signal I3d, and time $T_{dead}$ is a fixed quantity (e.g., on the order of hundreds of nanoseconds) based on the specifications of the transistors and/or gate drivers used. Time $T_{dead}$ can be sufficiently large so that no shoot-through condition occurs during phase lags and so that one transistor of a pair of transistors is conducting at a given time. For example, switch Q5 should not be on at the same time as its pair, switch Q7. As described below, these time delays can be used to generate delayed control signals (e.g., $PWM_{pdt5}$, $PWM_{pdt6}$, $PWM_{pdt7}$, $PWM_{pdt8}$). The delayed control signals can be provided to a dead-time compensation block 306.

Parameter β can be determined by a controller depending on a preferred system optimization. In some embodiments, the controller may be configured to create an equivalent impedance of the rectifier 214 and therefore select β to achieve that impedance. In some embodiments, the controller may be configured to maintain the impedance of the rectifier despite the changes in battery voltage (at load 216) and therefore select β to achieve maintenance. In some embodiments, the controller may be configured to maintain the power provided to the load 216 within a particular range and therefore select β to achieve maintenance of power. In some embodiments, β may be selected to maintain desirable coil current (e.g., in L1d) on the receiver side.

In some embodiments, $T_{del1}$ can be from 0.5 of a period ($T_{period}$) to 0.75 of a period ($T_{period}$). In some embodiments, $T_{del2}$ can be from 0.25 of a period ($T_{period}$) to 0.5 of a period ($T_{period}$). Delay time $T_{del1}$ can be used for the control signals for switches Q5 and Q7. Delay time $T_{del2}$ can be used for the control switches for switches Q6 and Q8. Note that switches Q5 and Q7 form soft-switching phase-leg, while switches Q6 and Q8 form hard-switching phase-leg. In the example illustrated in FIG. 3C, delay time $T_{del1}$ is equivalent to the difference between time t0 and t6 and delay time $T_{del2}$ is equivalent to the difference between t0 and t3.

In step 316, control system 322 (e.g., controller 318 and/or processor 320 coupled to the switches) can generate the first and second "pre-dead time" control signals $PWM_{pdt5}$, $PWM_{pdt7}$ for the first and second rectifier switches Q5, Q7, respectively, based on the first delay time $T_{del1}$. For example, the rising and falling edges 310a, 310b of signal Vzcd are used to produce the respective edges 324a, 324b of signals $PWM_{pdt5}$ and $PWM_{pdt7}$.

In step 326, control system 322 can generate the third and fourth "pre-dead time" control signals $PWM_{pdt6}$, $PWM_{pdt8}$ for the third and fourth rectifier switches Q6, Q8, respectively, based on the second delay time $T_{del2}$. For example, the rising and falling edges 310a, 310b of signal Vzcd are used to produce the respective edges 328a, 328b of signals $PWM_{pdt6}$ and $PWM_{pdt8}$.

In step 328, the dead-time insertion block 330 can insert a dead time $T_{dead}$ between the first pre-dead time control signal and the second pre-dead time control signal, $PWM_{pdt5}$ and $PWM_{pdt7}$, respectively. By inserting dead time between signals $PWM_{pdt5}$ and $PWM_{pdt7}$, the control system 322 produces control signals PWM5, PWM7 for respective rectifier switches Q5, Q7. In FIG. 3C(iv), arrows 332a and 332b indicate the dead-time $T_{dead}$ between the respective edges of signals PWM5, PWM7 (e.g., such that $T_{dead}$=t7–t6 and $T_{dead}$=t12–t11).

In step 334, the dead-time insertion block 330 can insert a dead time $T_{dead}$ between the third pre-dead time control signal and the fourth pre-dead time control signal, $PWM_{pdt6}$ and $PWM_{pdt8}$, respectively. By inserting dead time between signals $PWM_{pdt6}$ and $PWM_{pdt8}$, the control system 322 produces control signals PWM6, PWM8 for respective rectifier switches Q6, Q8. In FIG. 3C(vi), arrows 336a and 336b indicate the dead-time $T_{dead}$ between the edges of signals PWM6, PWM8 (e.g., such that $T_{dead}$=t4–t3 and $T_{dead}$=t9–t8).

In step 338, the control system 322 can provide control signals to the respective rectifier switches. In the example of a full-bridge rectifier having four switches (e.g., as in rectifier 214a), control signal PWM5 is generated for switch Q5; control signal PWM6 is generated for switch Q6; control signal PWM7 is generated for switch Q7; and control signal PWM8 is generated for switch Q8. In another example, for a rectifier having two high-side diodes and two low-side switches Q7 and Q8 (e.g., as in rectifier 214b), control signals PWM7 and PWM8 are provided to respective switch Q7 and Q8 only. In yet another example, for rectifier 214c, control signals PWM5 and PWM7 are provided to respective switch Q5 and Q8.

For an exemplary receiver 303 of the system 300 having the above-provided specifications and utilizing workflow 302, the value of filter inductor L3dA in system 300 can be approximately 35 µH. Series compensating capacitor can be used to maintain the same impedance at 85 kHz as the 7 uH inductor.

Second Exemplary Method—Resistive Input Impedance

Figure 4A:
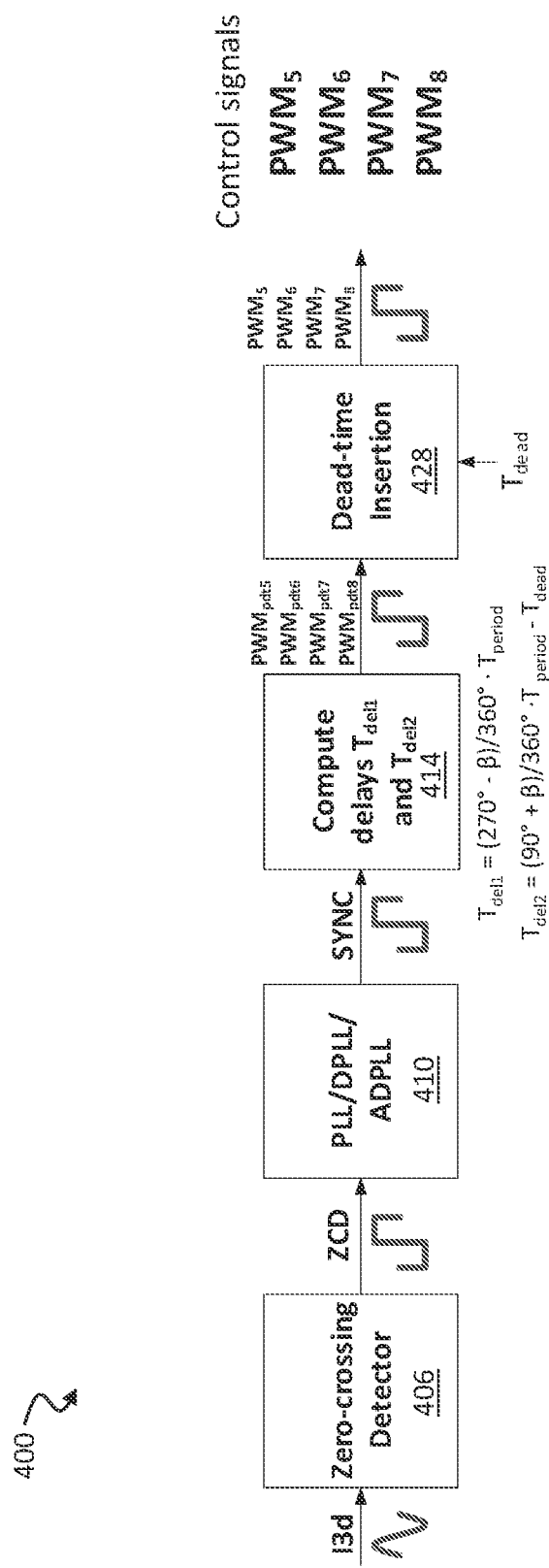
FIG. 4A is a diagram of an exemplary workflow \ for determining control signals for rectifier switches based on input current.
Figure 4B:
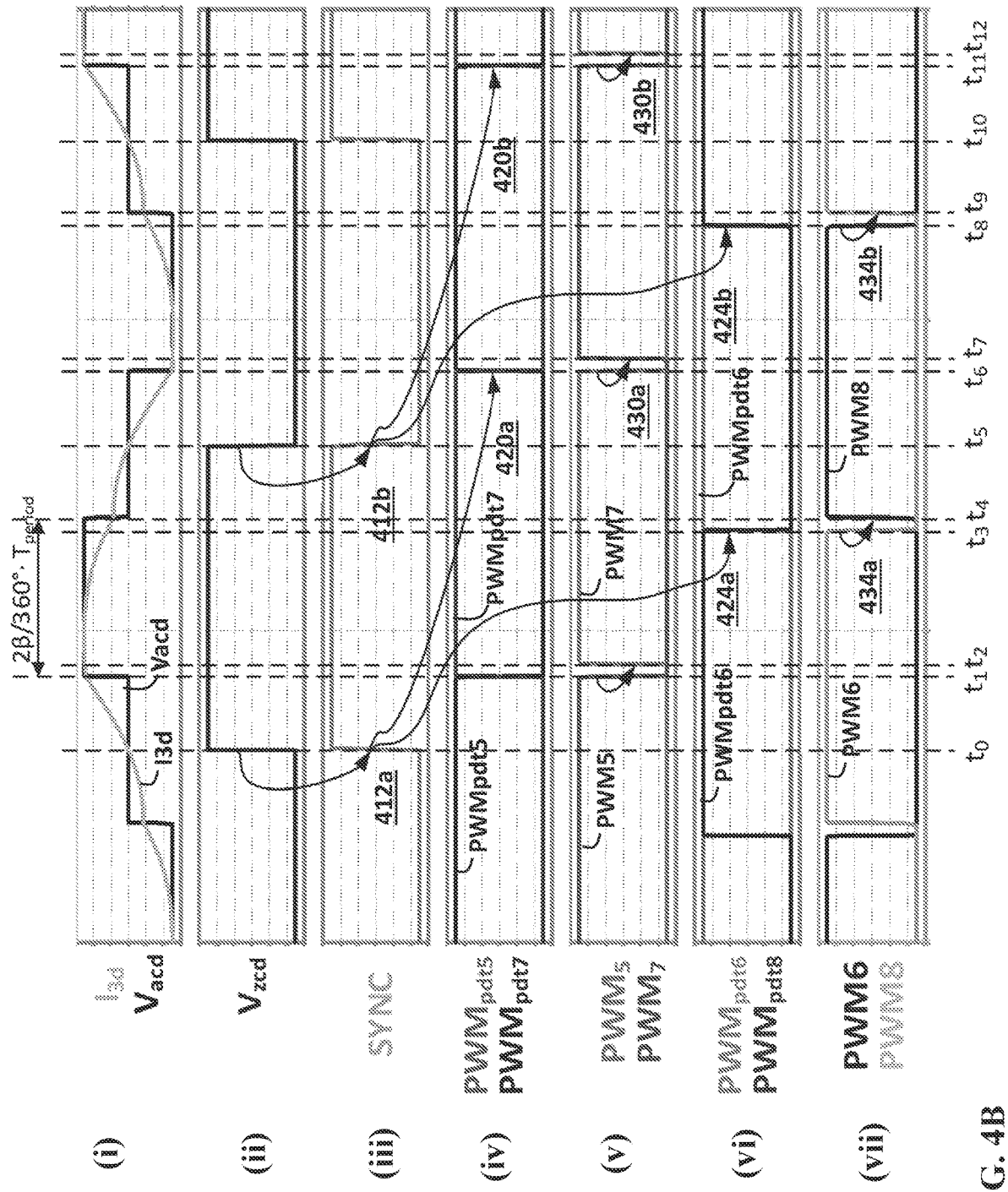
FIG. 4B is a set of plots illustrating various signals in the generation of the control signals as a function of time.
Figure 4C:
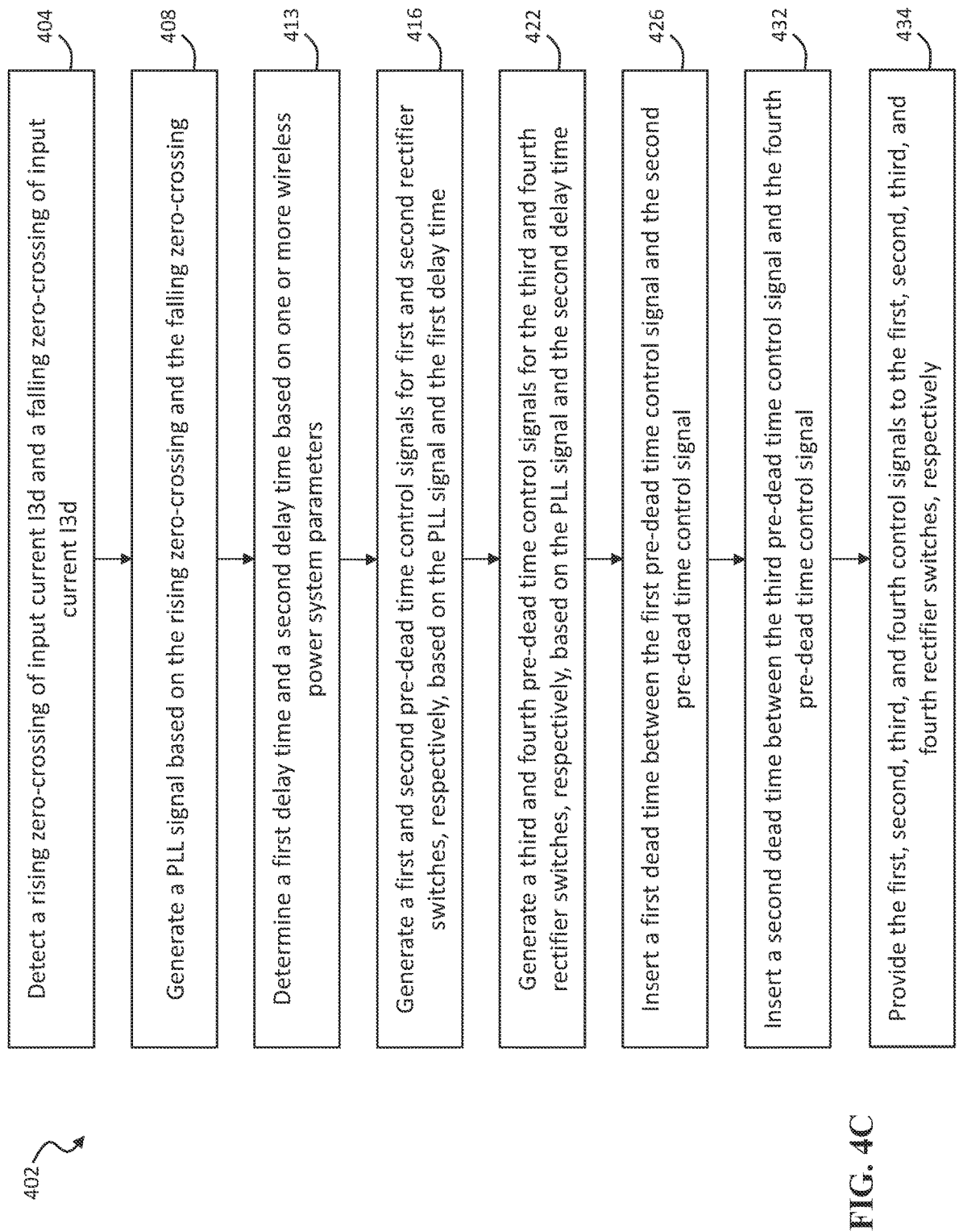
FIG. 4C is a flowchart of an exemplary method for rectifier switch control in a wireless power system.

FIG. 4A illustrates a workflow 400 of an exemplary method for generating control signals for the rectifier switches based on input current I3d. FIG. 4B is a set of plots illustrating various signals in the generation of the control signals as a function of time. FIG. 4C illustrates an exemplary method 402 for generating the control signals for a rectifier presenting a resistive impedance to one or more portions of the wireless power system (e.g., the transmitter 202, components between Vbus and arrow 305, etc.). For the sake of clarity and conciseness, FIGS. 4A-4C are discussed together herein.

Referring to FIG. 4A, the current I3d can be provided to zero-crossing detector 406 (e.g., of processor 320). An exemplary current I3d is provided in FIG. 4B(i). In step 404 of exemplary method 402, the zero-crossing detector 406 can detect the rising zero-crossing at time to of the rising input current signal I3d and the falling zero-crossing at time $t_5$ of the falling input current signal I3d. The zero-crossing detector 406 can output a voltage signal Vzcd having zero-crossing information of the current signal I3d.

In step 408, a phase delay lock (PLL) block 410 can generate a PLL signal based on the rising zero-crossing and the falling zero-crossing of current I3d. Block 410 outputs PLL signal "SYNC", as illustrated in FIG. 4B(iii), which is a signal "synchronized" to the zero-crossing signal Vzcd such that signal SYNC is in phase with signal Vzcd. In some embodiments, the SYNC signal may be a copy of the voltage signal Vzcd. In some embodiments, the SYNC signal may have the same phase and/or frequency of the signal Vzcd with a magnitude different from voltage signal Vzcd. For example, the rising edge of Vzcd corresponds to the rising edge of SYNC at time t0 (indicated by arrow 412a) and the falling edge of Vzcd corresponds to the falling edge of SYNC at time t5 (indicated by arrow 412b).

In step 413, the delay block 414 can determine a first delay time $T_{del1}$ and a second delay time $T_{del2}$ based on system parameter(s) (e.g., β as described further below). The delay block 414 can produce one or more time delays according to the following relationships:

$$T_{del1} = (270-\beta)/360 * T_{period} \quad \text{Time delay 1:}$$

$$T_{del2} = (90+\beta)/360 * T_{period} - T_{dead} \quad \text{Time delay 2:}$$

where 0≤β≤90°, $T_{period}$ is a single period in time of the input signal I3d, and time $T_{dead}$ is a fixed quantity based on the specifications of the transistors and/or gate drivers. $T_{dead}$ can be sufficiently large so that no shoot-through condition occurs during phase lags and so that one transistor of a pair of transistors is conducting at a given time. For example, switch Q5 is not on at the same time as its pair, switch Q7. The delayed signal can be provided to a dead-time compensation block 428.

Parameter β can be determined by a controller depending on a preferred system optimization. In some embodiments, the controller may be configured to create an equivalent impedance of the rectifier 214 and therefore select β to achieve that impedance. In some embodiments, the controller may be configured to maintain the impedance of the rectifier despite the changes in battery voltage (at load 216) and therefore select β to achieve maintenance. In some embodiments, the controller may be configured to maintain the power provided to the load 216 within a particular range and therefore select β to achieve maintenance of power. For the example provided in FIG. 4B, parameter β is selected to be 47 degrees.

In some embodiments, $T_{del1}$ can be from 0.5 of a period ($T_{period}$) to 0.75 of a period ($T_{period}$). In some embodiments, $T_{del2}$ can be from 0.25 of a period ($T_{period}$) to 0.5 of a period ($T_{period}$). Delay time $T_{del1}$ can be used for the control signals for switches Q5 and Q7. Delay time $T_{del2}$ can be used for the control switches for switches Q6 and Q8. Note that switches Q5 and Q7 form the soft-switching phase leg, while switches Q6 and Q8 form the hard-switching phase leg. In the example illustrated in FIG. 4B, delay time $T_{del1}$ is equivalent to the difference between time t0 and t6 and delay time $T_{del2}$ is equivalent to the difference between t0 and t3.

In step 416, delay block 414 can generate the "pre-dead time" first and second control signals $PWM_{pdt5}$ and $PWM_{pdt7}$, respectively for the first and second rectifier switches, Q5 and Q7, respectively, based on the PLL signal SYNC and the first delay time $T_{del1}$. For example, the rising and falling edges 420a, 420b of signal SYNC are used to produce the edges 420a, 420b of signals $PWM_{pdt5}$ and $PWM_{pdt7}$.

In step 422, delay block 414 can generate the "pre-dead time" third and fourth control signals $PWM_{pdt6}$ and $PWM_{pdt8}$, respectively for the third and fourth rectifier switches Q6 and Q8, respectively, based on the PLL signal SYNC and the second delay time $T_{del2}$. For example, the rising and falling edges 412a, 412b of signal SYNC are used to produce the edges 424a, 424b of signals $PWM_{pdt6}$ and $PWM_{pdt8}$.

In step 426, dead-time compensation block 428 can insert a dead time $T_{dead}$ between the "pre-dead time" first control signal and the "pre-dead time" second control signal $PWM_{pdt5}$ and $PWM_{pdt7}$, respectively. Dead-time insertion is illustrated in FIG. 4B(v). By inserting dead time between time t6 and time t7, the control system 322 produces control signals PWM5, PWM7 for respective rectifier switches Q5, Q7. In FIG. 4B(v), arrows 430a, 430b indicate the dead time $T_{dead}$ between the respective edges of signals PWM5, PWM7 (e.g., such that $T_{dead}$=t7–t6 and $T_{dead}$=t11–t12).

In step 432, block 428 can insert a dead time $T_{dead}$ between the "pre-dead time" third control signal and the "pre-dead time" fourth control signal $PWM_{pdt6}$ and $PWM_{pdt8}$, respectively. Dead-time insertion is illustrated in FIG. 4B(vii). By inserting dead time between time t3 and t4, the control system produces control signals PWM6, PWM8 for respective rectifier switches Q6, Q8. In FIG. 4B(vii), arrows 434a, 434b indicate the dead time $T_{dead}$ between the respective edges of signals PWM6, PWM8 (e.g., such that $T_{dead}$=t4–t3 and $T_{dead}$=t9–t8).

In step 434, control system 322 can provide control signals (e.g., PWM5, PWM6, PWM7, and PWM8) to the respective rectifier switches (e.g., Q5, Q6, Q7, and Q8, respectively). In the example of a full-bridge rectifier having four switches (e.g., as in rectifier 214a), control signal PWM5 is generated for switch Q5; control signal PWM6 is generated for switch Q6; control signal PWM7 is generated for switch Q7; and control signal PWM8 is generated for switch Q8. In another example, for a rectifier having two high-side diodes and two low-side switches Q7 and Q8 (e.g., as in rectifier 214b), control signals PWM7 and PWM8 are provided to respective switch Q7 and Q8 only. In yet another example, for rectifier 214c, control signals PWM5 and PWM7 are provided to respective switch Q5 and Q8.

For an exemplary receiver 204 of the system 200 having the above-provided specifications, the value of filter inductors L3sA, L3sB in method 402 can be approximately 14 µH. Note that the filter inductors L3sA, L3sB of method 402 is approximately five times less in value as the filter inductors L3sA, L3sB of method 304. This can result in a reduced footprint (e.g., size, volume, etc.) and/or cost for a system employing method 402.

Third Exemplary Method—Capacitive Input Impedance

Figure 5A:
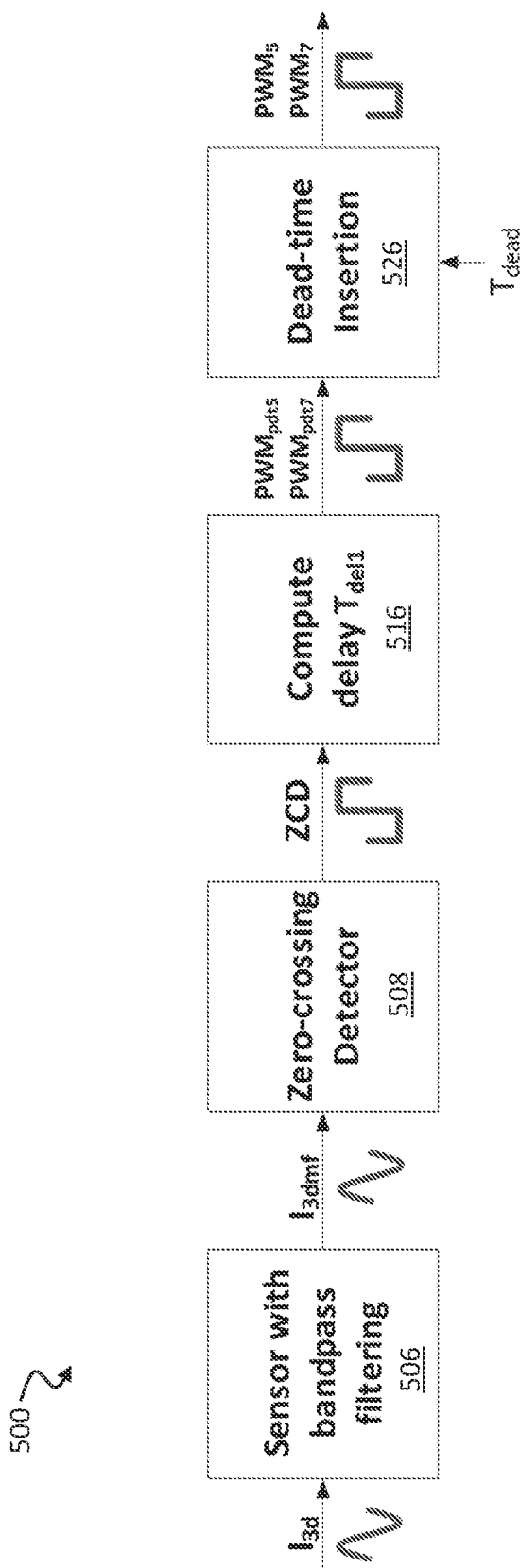
FIG. 5A is a diagram of an exemplary workflow for generating control signals for rectifier switches based on input current.
Figure 5B:
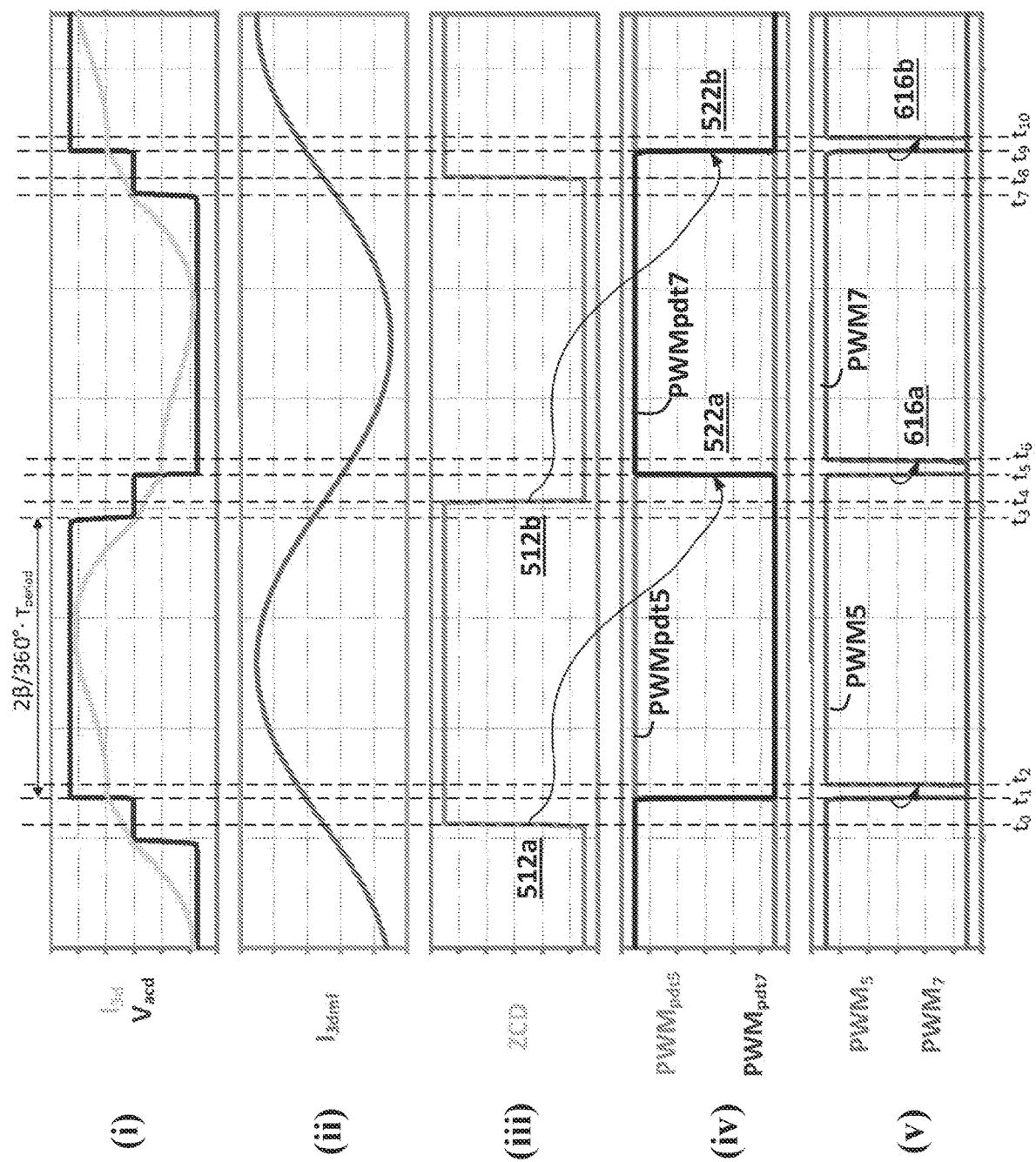
FIG. 5B is a set of plots illustrating various signals in the generation of the control signals as a function of time.
Figure 5C:
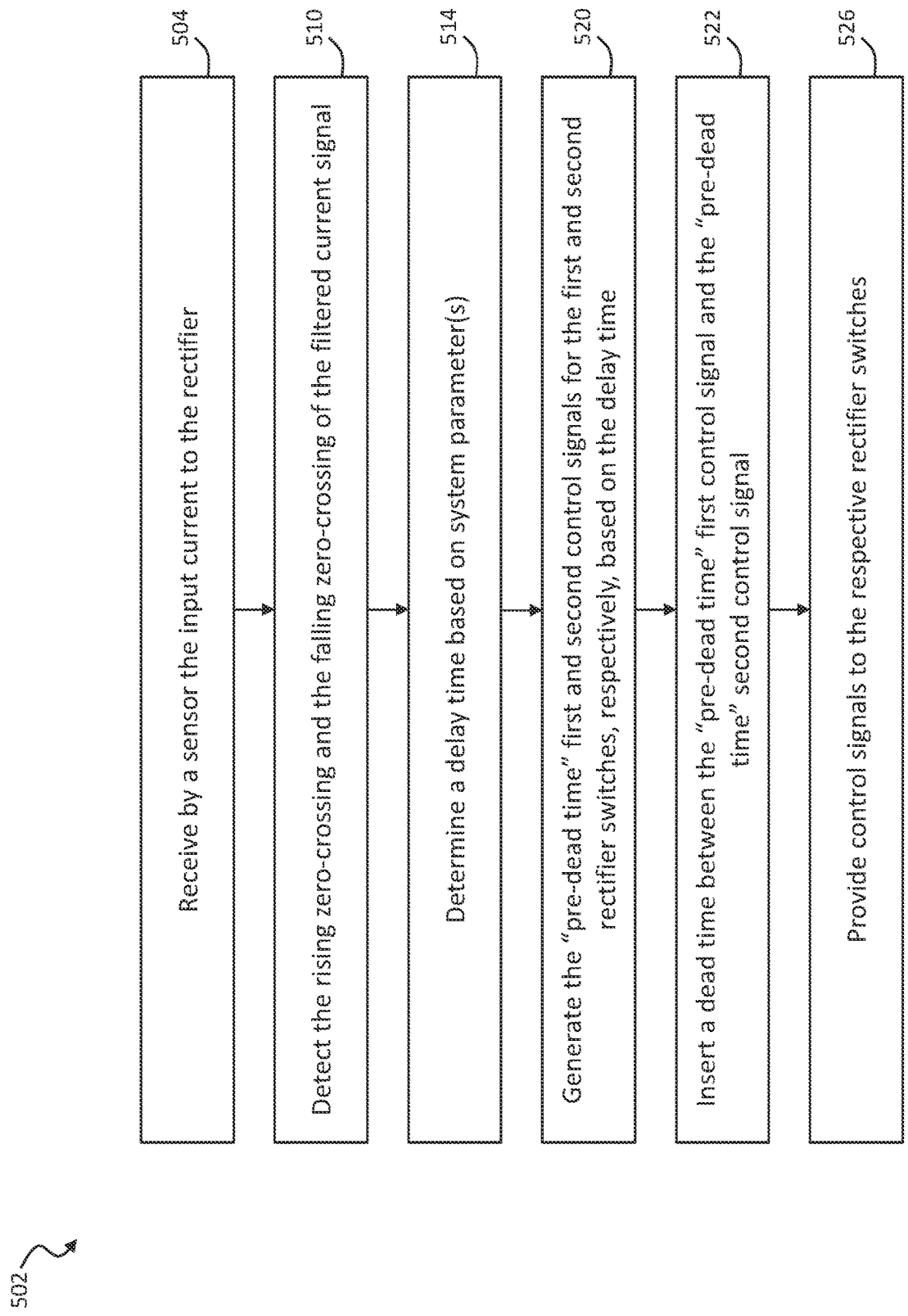
FIG. 5C is a flowchart of an exemplary method for rectifier switch control in a wireless power system.

FIG. 5A illustrates a workflow 500 corresponding to an exemplary method for generating the control signals for the rectifier switches based on input current I3d. FIG. 5B is a set of plots illustrating various signals in the generation of the control signals as a function of time. FIG. 5C illustrates an exemplary active rectification method 502 in a rectifier presenting a capacitive impedance to one or more portions of the wireless power system (e.g., the transmitter 202, components between Vbus and arrow 305, etc.). For the sake of clarity and conciseness, FIGS. 5A-5C are discussed together herein.

In step 504, a sensor 506 can receive the input current I3d. In some embodiments, sensor 506 can include a filter (e.g., a bandpass filter, a low-pass filter, a high-pass filter, etc.). In a preferred embodiment, the exemplary sensor 506 includes a bandpass filter characterized by the following transfer function:

$$H(s) = \frac{\frac{\omega_0}{Q_f} \cdot s}{s^2 + \frac{\omega_0}{Q_f} \cdot s + \omega_0^2}$$

where $\omega_0 = 2*\pi/T_{period}$ and Qf is the quality factor of the filter. The filtering of the current I3d may stabilize the modulator and thereby enable stable output control (PWM) signals. The filtered current signal I3dmf is then provided to a zero-crossing detector 508.

In step 510, the zero-crossing detector 508 can detect the rising zero-crossing of the filtered current signal I3dmf and the falling zero-crossing of the filtered current signal I3dmf. The detector 508 can produce an output signal ZCD (e.g., a voltage Vzcd and/or current Izcd) having zero-crossing information. For example, as illustrated in FIG. 5B(iii), edge 512a of signal ZCD corresponds to the rising zero-crossing of signal I3dmf (at time t0) and edge 512b of signal ZCD corresponds to falling zero-crossing of signal I3dmf (at time t4).

In step 514, delay block 516 can determine a delay time $T_{del1}$ based on system parameter(s) (e.g., β as described further below). The delay block 516 can produce one or more time delays according to the following relationship:

Time delay: $T_{del1}(270-\beta)/360*T_{period}$ where 0≤β≤90°, $T_{period}$ is a single period in time of the input signal ZCD, and time $T_{dead}$ is a fixed quantity based on the specifications of the transistors and/or gate drivers. $T_{dead}$ can be sufficiently large so that no shoot-through condition occurs during phase lags and so that one transistor of a pair of transistors is conducting at a given time. For example, switch Q5 is not on at the same time as its pair, switch Q7. The delayed signals $PWM_{pdt5}$, $PWM_{pdt7}$ can be provided to a dead-time compensation block 518.

Parameter β can be determined by a controller depending on a preferred system optimization. In some embodiments, the controller may be configured to create an equivalent impedance of the rectifier 214 and therefore select β to achieve that impedance. In some embodiments, the controller may be configured to maintain the impedance of the rectifier constant despite the changes in battery voltage (at load 216) and therefore select β to achieve maintenance. In some embodiments, the controller may be configured to maintain the power provided to the load 216 within a particular range and therefore select β to achieve maintenance of power. In the example provided in FIG. 5B, parameter β was selected to be 75 degrees.

In step 520, the delay block 516 can generate the "pre-dead time" first and second control signals PWM$_{pdt5}$ and PWM$_{pdt7}$, respectively, for the first and second rectifier switches Q5 and Q7, respectively, based on the delay time T$_{del1}$. In the example illustrated in FIG. 5B, delay time T$_{del1}$ is equivalent to the difference between time t0 and t5. For example, the rising and falling edges 512a, 512b of signal ZCD are used to produce the edges 522a, 522b of signals PWM$_{pdt5}$ and PWM$_{pdt7}$.

In step 524, dead-time insertion block 526 can include inserting a dead time T$_{dead}$ between the "pre-dead time" first control signal and the "pre-dead time" second control signal. By inserting dead time between time t5 and t6, the control system 322 produces control signals PWM$_{pdt5}$ and PWM$_{pdt7}$ for respective rectifier switches Q5, Q7. In particular, arrows 528a, 528b indicate the dead time T$_{dead}$ between the edges of signals PWM5, PWM7 in plot FIG. 5B(v). Note that commutation of the diode half-bridge (e.g., diodes D6, D8) occurs between times t3 and t7 such that t7−t3=T$_{period}$/2.

In step 530, control system 322 can provide control signals PWM5, PWM7 to the respective rectifier switches Q5, Q7 (e.g., of rectifier 214c).

One advantage is that the exemplary method 502 can enable the use of a smaller inductor at filter inductors L3sA, L3sB, thereby reducing the physical volume of the receiver 204. The exemplary method 502 may also achieve greater efficiency as compared to methods which include the active control of four switches (e.g., Q5, Q6, Q7, and Q8) of the rectifier 214.

Fourth Exemplary Method—Phase Shift Control

Figure 6A:
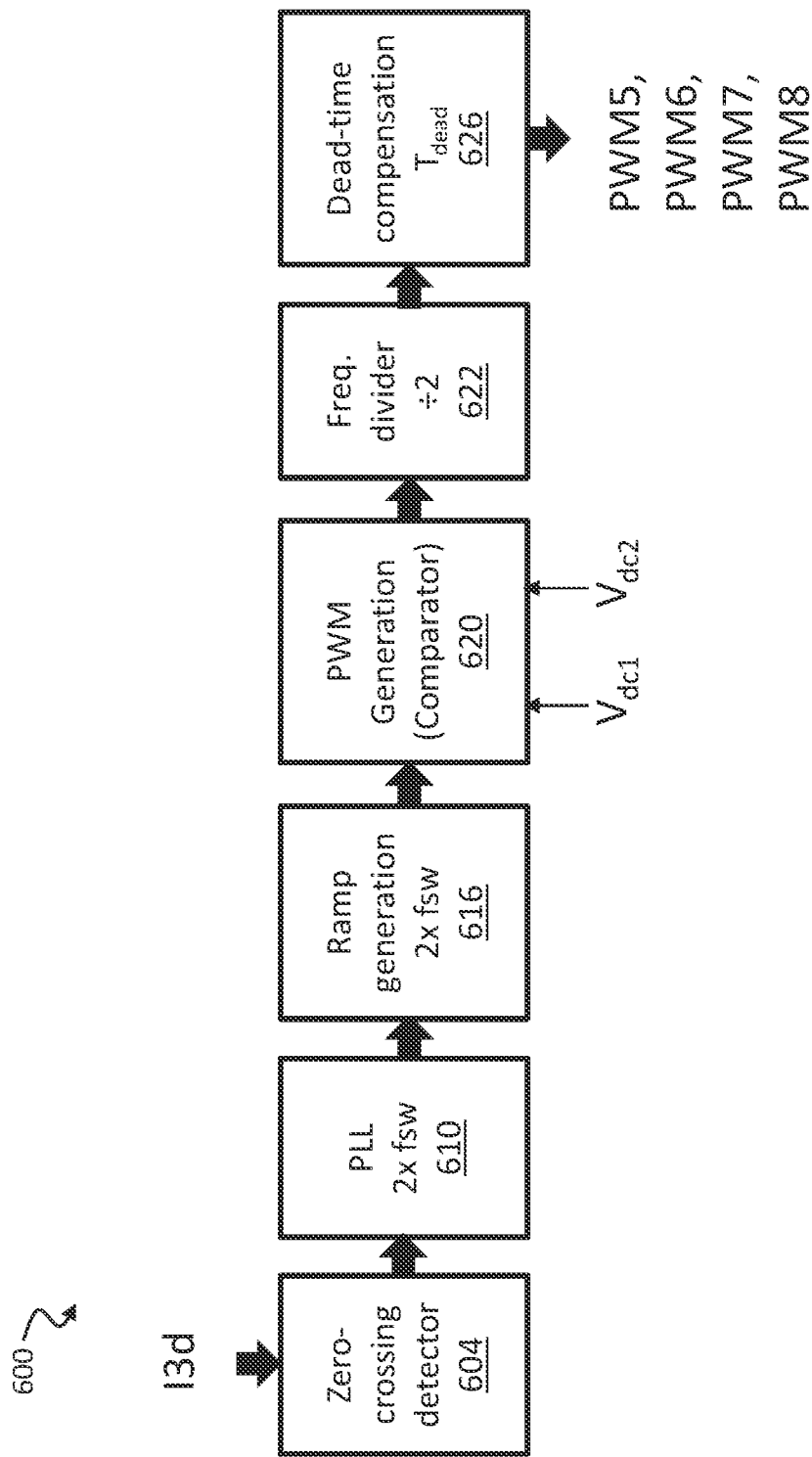
FIG. 6A is a diagram of an exemplary workflow for determining control signals for rectifier switches based on input current and input voltage.
Figure 6B:
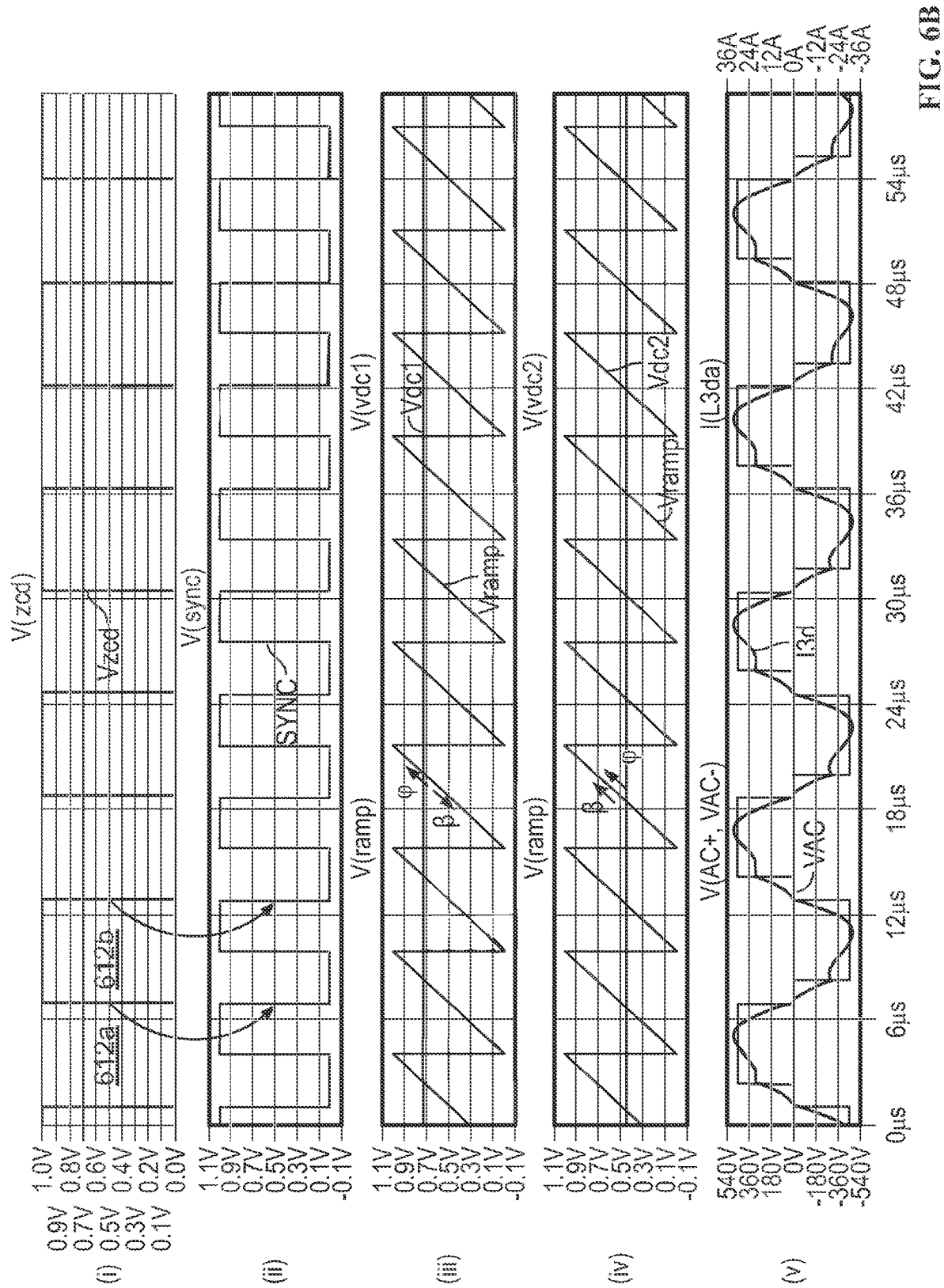
FIG. 6B is a set of plots illustrating various signals in the generation of the control signals as a function of time.
Figure 6C:
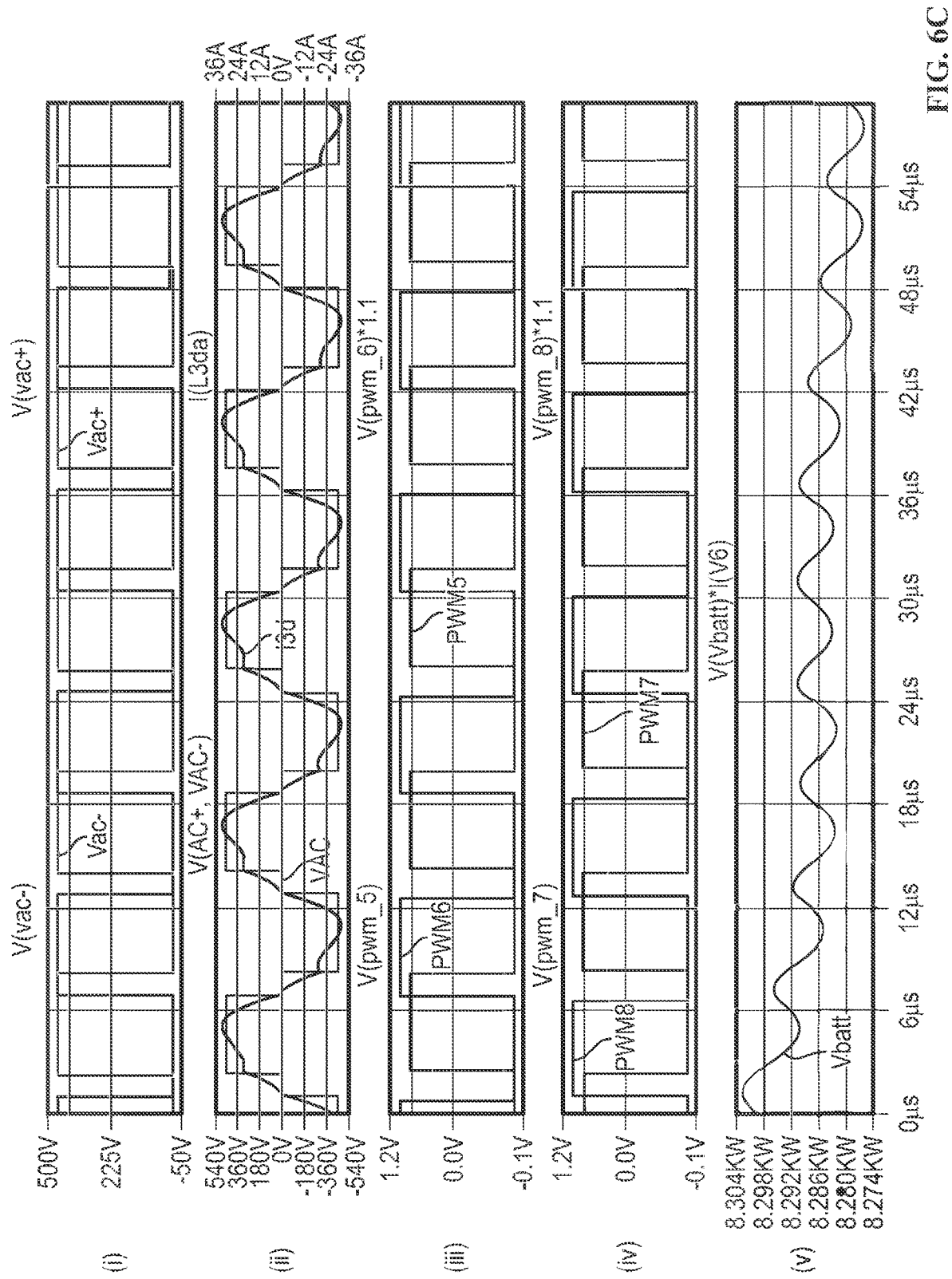
FIG. 6C is a flowchart of an exemplary method for rectifier switch control in a wireless power system.
Figure 6D:
FIG. 6D is a flowchart of a method for generating control signals according to the workflow of FIG. 6A.

FIG. 6A illustrates a workflow 600 for an exemplary method for generating control signals for rectifier switches by controlling the relative phase shift between input current I3d and input voltage VAC (also referred to as Vacd). FIGS. 6B-6C are a set of plots illustrating the generation of control signals as a function of time according to workflow 600. FIG. 6D illustrates a method 602 for generating control signals according to the workflow 600. Note that the control scheme of method 602 may be implemented in the mixed signal or digital domain. For the sake of clarity and conciseness, FIGS. 6A-6D are discussed together herein.

Referring to FIG. 6A, current I3d can be inputted to a zero-crossing detector 604 (e.g., of control system 322). An exemplary current I3d is provided in FIG. 6B(v). In step 606, detector 604 is configured to detect the zero-crossing(s) of input current I3d. Referring to FIG. 6B(i), the detector 604 can output a zero-crossing detection signal Vzcd indicating the zero-crossings of the current signal I3d. As described herein for other methods, zero-crossing information can be used to synchronize the switching patterns of switches Q5, Q6, Q7, and/or Q8 to the current zero-crossings.

In step 608, a phase delay lock (PLL) block 610 can generate a PLL signal based on the rising zero-crossing and the falling zero-crossing of current I3d. Block 610 outputs PLL signal "SYNC", as illustrated in FIG. 6B(ii), which is a signal "synchronized" to the zero-crossing signal Vzcd such that signal SYNC is in phase with signal Vzcd. In some embodiments, the SYNC signal may have a frequency at least two times the frequency of the voltage signal Vzcd. In some embodiments, the SYNC signal may have a magnitude different from voltage signal Vzcd. For example, the rising edge of Vzcd corresponds to a falling edge of SYNC (indicated by arrow 612a) and the falling edge of Vzcd corresponds to the rising edge of SYNC (indicated by arrow 612b) such that one period of signal Vzcd corresponds to two periods of signal SYNC.

In step 614, the ramp generation block 616 (e.g., of control system 322) can generate at least one ramp signal Vramp based on the output PLL signal. Ramp signal Vramp is used to produce PWM signals with the help of Vdc1 and Vdc2 defined with the following relationships:

$$V_{dc1} \approx 1 - \frac{\beta - \varphi}{180}$$

$$V_{dc2} \approx \frac{\beta + \varphi}{180}$$

where parameter β is selected to control the resistive impedance of the rectifier and is selected according to desired system optimization (as described above) and parameter φ is selected to control the capacitive impedance of the rectifier. In the example provided in FIGS. 6B-6C, parameter β=70 and parameter φ=20 for an exemplary system 200 configured to deliver 8.3 kW to the battery 216.

In step 618, the PWM generator 620 (e.g., of control 622) can generate pre-dead time PWM signals PWM$_{pdt5}$, PWM$_{pdt6}$, PWM$_{pdt7}$, PWM$_{pdt8}$ for switches Q5, Q6, Q7, Q8 based on the signals Vdc1 and Vdc2. In some embodiments, the control system (e.g., the modulator of system 322) can modulate signals Vdc1 and Vdc2 to form control signals (e.g., pre-dead time PWM signals).

In frequency divider block 622, the frequency of the pre-dead time PWM signals is divided. In some embodiments, the frequency is divided by a factor of 2. In some embodiments, the frequency is divided by a factor greater than 2 (e.g., 2.5, 3, 4, etc.).

In step 624, dead-time compensation block 626 can insert a dead time T$_{dead}$ between the pre-dead time first control signal PWM$_{pdt5}$ and the pre-dead time second control signal PWM$_{pdt7}$. By inserting dead time, the control system 322 produces control signals PWM5, PWM7 for respective rectifier switches Q5, Q7.

In step 628, block 626 can insert a dead time T$_{dead}$ between the pre-dead time third control signal PWM$_{pdt6}$ and the "pre-dead time" fourth control signal PWM$_{pdt8}$. By inserting dead time, the control system produces control signals PWM6, PWM8 for respective rectifier switches Q6, Q8.

In step 630, control system 322 can provide control signals (e.g., PWM5, PWM6, PWM7, and PWM8) to the respective rectifier switches (e.g., Q5, Q6, Q7, and Q8, respectively). In the example of a full-bridge rectifier having four switches (e.g., as in rectifier 214a), control signal PWM5 is generated for switch Q5; control signal PWM6 is generated for switch Q6; control signal PWM7 is generated for switch Q7; and control signal PWM8 is generated for switch Q8. In another example, for a rectifier having two high-side diodes and two low-side switches Q7 and Q8 (e.g., as in rectifier 214b), control signals PWM7 and PWM8 are provided to respective switch Q7 and Q8 only. In yet another example, for rectifier 214c, control signals PWM5 and PWM7 are provided to respective switch Q5 and Q8.

Application to Bidirectional Wireless Power Transmission

In various embodiments, the active rectification systems and methods described herein can be employed in bidirectional wireless power systems. For instance, a wireless power system may be configured such that wireless power is transmitted from a transmitter to a receiver (also referred to as "unidirectional"). In some cases, a wireless power system may be configured such that wireless power is transmitted from a first device to a second device (e.g., from a transmitter to a receiver) and/or from a second device to the first device (e.g., from a receiver to transmitter). Examples of bidirectional wireless power systems and methods can be found in U.S. Publication No. 2019/0006836 titled "Protection and control of wireless power systems" and published Jan. 3, 2019, and U.S. Publication No. 2020/0094696 titled "Wireless power transmission in electric vehicles" and published Mar. 26, 2020.

Figure 7:
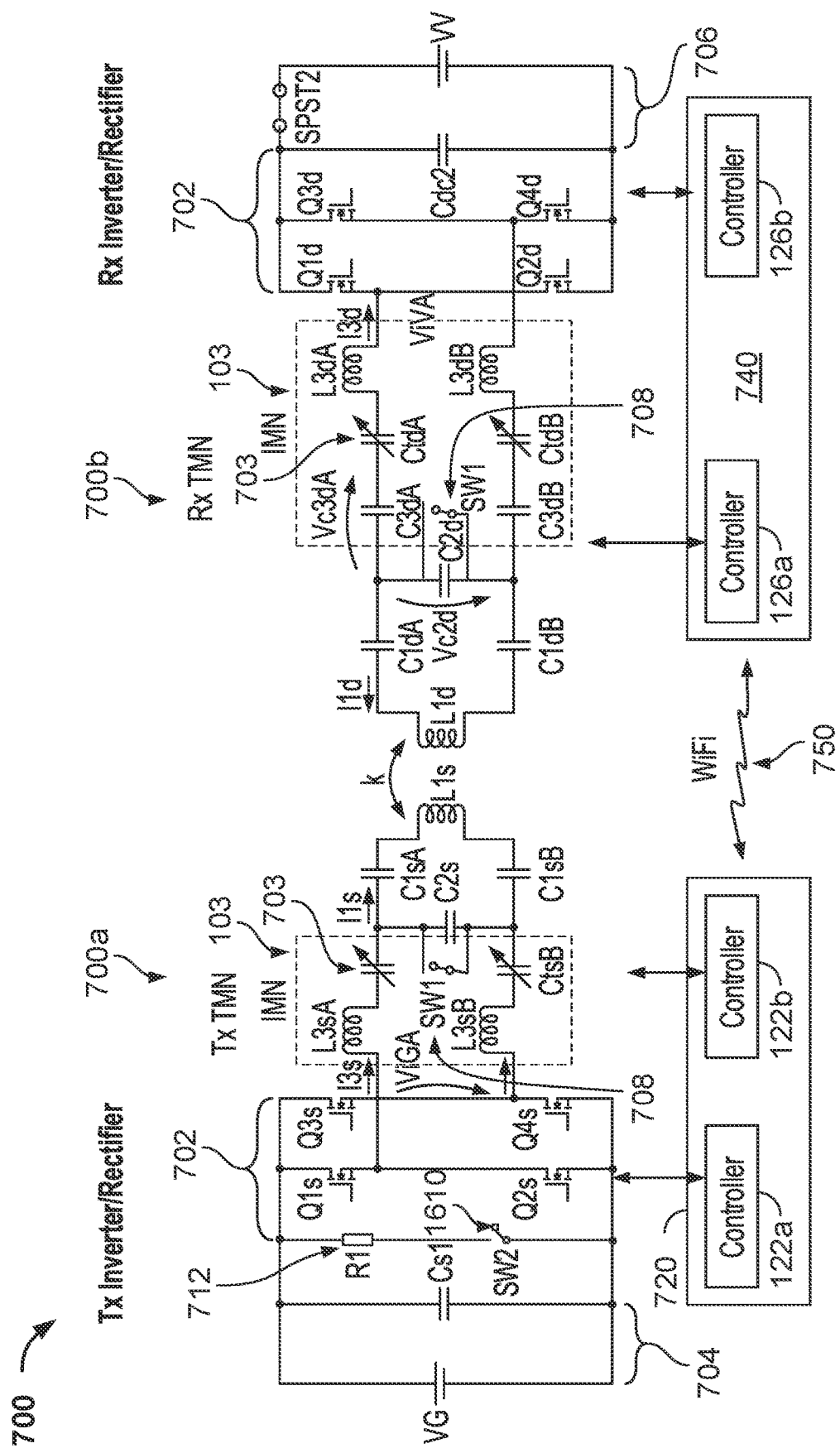
FIG. 7 is a schematic of an exemplary bidirectional wireless power transfer system.

FIG. 7 shows a schematic of an exemplary bidirectional wireless power system 700. The schematic depicts both a transmitter (Tx) side wireless power device 700*a* and a receiver (Rx) side wireless power device 700*b*. As noted above, the Tx-side wireless power device 700*a* generally operates as a wireless power transmitter for the case of a similar unidirectional wireless power system (e.g., system 200 or 300). The Tx-side device 700*a* may also be referred to as a ground assembly (GA) or GA-side device when used in the context of a wireless power device coupled to an electric vehicle or other mobile vehicle. As discussed below, however, in the bidirectional system the Tx-side refers generally to a wireless power device that is coupled to or configured to be coupled to a stationary power supply or load such as a power grid, AC generator, etc. Furthermore, the Tx-side system is generally capable of handling higher power, voltage, or current transients than the Rx-side wireless power device 700*b*. On the other hand, the Rx-side wireless power device 700*b* generally operates as a wireless power receiver for the case of a similar unidirectional wireless power transfer system (e.g., system 200 or 300). As discussed below, however, in the bidirectional system the Rx-side refers generally to a wireless power device that is coupled to or configured to be coupled to a mobile (or generally more limited) power supply or load such as a battery or a battery powered device (e.g., a computing device or an electric vehicle). The Rx-side wireless power device 700*b* can also be referred to as a vehicle assembly (VA) or VA-side device when used in the context of a wireless power device coupled to an electric vehicle or other mobile vehicle.

In exemplary bidirectional system 700, both the Tx-side device 700*a* and the Rx-side device 700*b* include an inverter-rectifier 702. The inverter-rectifier 702 can include a bridge configuration of switching elements and/or diodes. For example, the inverter-rectifier 702 can include active switching elements, such as MOSFETs, which permit the inverter-rectifier 702 to operate as either an inverter or a rectifier in a bidirectional system. As discussed in more detail below, the operating mode (also referred to herein as an "operating personality") of the inverter-rectifier 702 can be controlled based on the pattern of PWM control signals supplied to the switching elements. In some embodiments, the inverter-rectifier 702 may be operated according to one or more active rectification methods (e.g., method 304, 402, 502, and/or 602) described herein.

The system 700 is able to power a load with power transmission in a first direction (e.g., a normal power flow direction from transmitter 700*a* to receiver 700*b*), such as a battery of a vehicle, off of power input to the transmitter 700*a*. Alternatively, the system 700 can supply power in a second direction (e.g., a reverse power flow direction), such as suppling power to a power grid coupled to the Tx-side device 700*a* from a battery of an electric vehicle coupled to the Rx-side device 700*b*. As another example, the bidirectional system 700 can be used to power a home during a power outage from a battery of an electric vehicle battery parked in a garage.

Where single components are shown, including resistors, inductors, and capacitors, banks of components, including in series and/or parallel can be utilized. Where tunable components are shown, fixed components can be included in series and/or parallel with the tunable components. In some implementations, the controller 122*a* and 122*b* can be combined in a single controller 720. Likewise, in some implementations, the controller 126*a* and 126*b* can be combined in a single controller 740.

In some implementations, the controllers 720 and 740 include a bidirectional manager. The bidirectional manager coordinates the configuration of different hardware and software components wireless power device (e.g., either 700*a* or 700*b*) according to the direction of power flow as indicated by an operating personality assigned to the device. For example, an operating personality of INV indicates that the inverter-rectifier is operating as an inverter and therefore the wireless power device 700*a*/700*b* is operating as a transmitter. Similarly, for example, an operating personality of REC indicates that the inverter-rectifier is operating as a rectifier and therefore the wireless power device 700*a*/700*b* is operating as a receiver. The bidirectional manager also coordinates transitions from one direction of power flow to the opposite direction of power flow. For example, the bidirectional manager of the Rx-side device 700*b* can communicate with the bidirectional manager of the Rx-side device 700*a* through a wireless communication link 750 (e.g., a Wi-Fi link) to coordinate a power reversal. The bidirectional manger can be implemented as separate controller within each device 700*a*/700*b* or in software.

More specifically, various hardware and software components of the system can have different operating setpoints, modes and/or ranges of operations depending on the direction of flow of power, and by extension, the operating personality of the wireless power device 700*a*/700*b*. The various operating set points, modes and/or ranges of operation can be stored in memory or in hardware. Each component of the system (e.g. the inverter-rectifier 702, tunable matching network (TMN) 703, and other components) including various controllers, filters, communication systems, and/or protection systems can assume a different "operating personality" depending on the direction of power flow.

The wireless power device's bidirectional manager can assign an appropriate personality at system startup and/or during a power flow transition based on the expected direction of power flow through the wireless power system 700 as a whole. For example, upon receipt of a command to switch from one mode of operation for the system to another (for example, by an operator interface, and/or user interface connected to either or all of the controllers, on either or both sides of the system or off system, such as on a network, the grid, or a mobile device), the bidirectional manager can assign the various component controllers (e.g., 122*a*, 122*b*, 126*a*, and 126*b*) a respective operating personality. Each controller can use the assigned operating personality to identify and load appropriate operating processes or software code to control associated components of the wireless power transfer device 700*a*/700*b*. For instance, when an inverter-rectifier controller is assigned an operating personality of an inverter (e.g., INV), the controller will load software code to generate PWM control signal patterns to operate the inverter-rectifier switching elements to generate AC output signals from a DC input signal. On the other hand, when an inverter-rectifier controller is assigned an operating personality of a rectifier (e.g., REC), the controller will load software code to generate PWM control signal patterns to operate the inverter-rectifier switching elements to rectify an AC input signal into a DC output signal.

Furthermore, the bidirectional manager can provide the power demand, the power flow direction, choose the appropriate software code blocks, and assign personalities to sub-controllers or other controller(s). The bidirectional manager can determine the errors that are recoverable or not recoverable, depending on the side the system the controller is located on, and the operating personality it assumes for components of the system. The operational personalities can be assigned based on the expected power flow direction, e.g. vehicle-to-grid (V2G) power flow, or grid-to-vehicle (G2V) power flow. Moreover, the bidirectional manager can determine the time and/or mode for recovery for those errors and/or clear errors when they are recovered so no user intervention is needed. The bidirectional manager can communicate with the user, the controller(s) of the other side of the system (e.g., the bidirectional manager on the other side of the system).

The bidirectional manager can receive notification of an error from a component of the wireless power system and the error messages can be allocated to other components of the wireless power system, either directly by the bidirectional manager or after a callback request from the components.

The bidirectional manager can receive communication from components of the wireless power system (e.g., via Wi-Fi from components from the other side of the system). The bidirectional manager can fulfill callback requests from components for messages related to the component, or can allocate the message to the relevant components. The bidirectional manager can control, including dynamically, the privileges of the components of the wireless power system to receive and send error and communication messages. The bidirectional manager can be responsible for controlling the components of the wireless power system during the transition phases, including handling any error conduction arising from the change of power transfer direction (both V2G and G2V transitions). For example, the bidirectional manager can oversee turning down of power, confirm power has fully or partially turned off, and sequence the components of the system to turn on (while assigning personalities to the components).

As an example, the bidirectional manager on the transmitter controller receives a command to turn on power from idle, the bidirectional manager may assign G2V personality to the various controllers and hardware in the system. Upon receipt of a communication to change the power transmission direction, the bidirectional manager communicates between the transmitter and receiver to change power transmission direction. The bidirectional manager can be responsible for handling any error arising from the change of power transmission direction, including during the power down of the first direction and the power up of the second direction. When the error is cleared, the bidirectional manager can assign personality to the controller(s), for example, by selecting a subset of instructions from a non-transitory computer readable medium, or causing the controller(s) to select the subset of instructions.

In some implementations, each controller of the system (e.g., a dedicated inverter-rectifier processor, or a dedicated TMN processor, or a dedicated transmitter or receiver processor) can contain a bidirectional manager. The bidirectional manager can operate as a top-level manager.

Generally, assigning a personality to components/controllers can allow for modularity, non-redundant parts, code, and memory, allows for faster and on-the-fly switchover from G2V (grid-to-vehicle power flow) to V2G (vehicle-to-grid power flow) and back.

Figure 8:
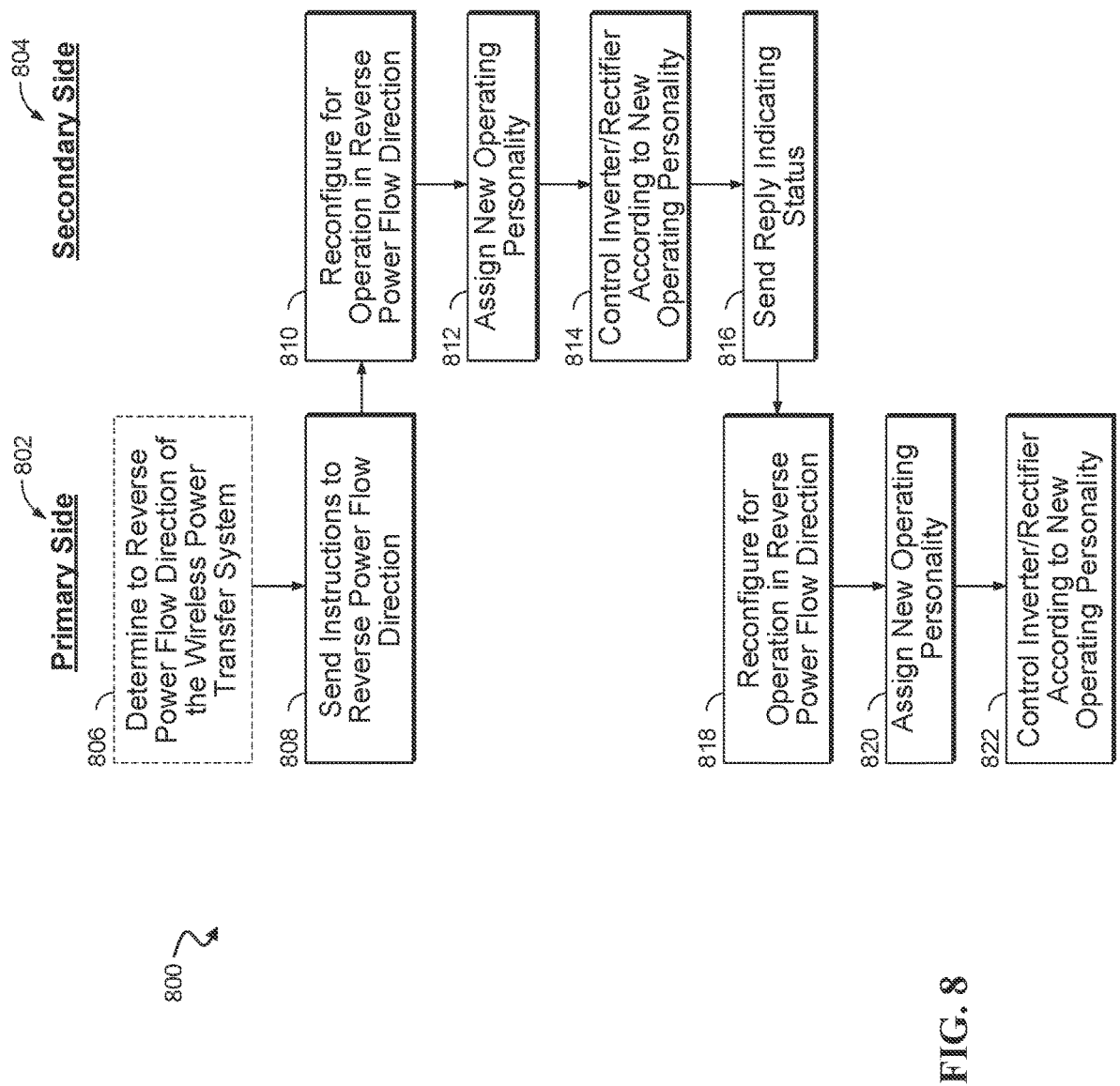
FIG. 8 is a flowchart of an exemplary bidirectional control process.

FIG. 8 depicts flowchart of an exemplary bidirectional control process 800 that can be executed in accordance with implementations of the present disclosure. The example process 800 can be implemented, for example, by the example wireless power systems disclosed herein. For example, the process 800 can be executed between a bidirectional manager of a transmitter wireless power device 700a and a bidirectional manager of a receiver wireless power device 700b. Process 800 shows divided primary side operations 802 and secondary side 804 operations. Generally, the primary side operations 802 are performed by a receiver wireless power device 700b while the secondary side operations 704 are performed by a Tx-side wireless power device 700a. For example, the receiver (or device-side) wireless power device 700b may generally be coupled to a smaller capacity or more limited power source or load. Implementing the receiver wireless power device 700b as a primary device may provide more precise control of the bidirectional control process 800 to prevent exceeding possible lower operating limits of the Rx-side system or its load/source. In some examples, the example process 800 can be provided by one or more computer-executable programs executed using one or more computing devices, processors, or microcontrollers. For example, the example process 800, or portions thereof, can be provided by one or more programs executed by control circuitry of wireless power devices 700a, 700b.

The primary device initiates a power flow transition within the wireless power system. The initiation may be prompted by a user input, or in some implementations by an automatic power transition determination performed by the primary device (806). For example, the primary device can determine to shift power flow based on various criteria including, but not limited to, state of charge of a battery, time of day, and availability and/or demand of grid-power. For example, a Rx-side wireless power device 700b can be configured to initiate a power flow reversal process when a connected battery is above a threshold charge level and a loss of grid power occurs. As another example, a Rx-side wireless power device 700b can be configured to initiate a power flow reversal process when a connected battery is above a threshold charge level and during a preset time of day. For instance, the Rx-side wireless power device 700b can be configured reverse power flow in order to provide supplemental power to a home during peak load periods of a power grid (e.g., periods of high demand and/or high energy prices such as evenings). In some implementations, the secondary device can determine when to initiate a power flow transition, but would perform an additional step of requesting initiation of the power flow transition from the primary device.

The primary device sends instructions to the secondary device to reverse the direction of power flow (808). In response to the instructions, the secondary device reconfigures for operating in the opposite power flow direction from its current operations (810). For example, if the secondary device was operating as a transmitter it will reconfigure for operation as a receiver. If the secondary device was operating as a receiver it will reconfigure for operation as a transmitter. For example, the secondary device's bidirectional manager can coordinate controller operations within the secondary device to shut down power flow in the present direction by, for example, securing operation of the inverter-rectifier, shifting switches to disconnect a load/power supply (as appropriate), toggling bypass switches to dissipate residual currents within the secondary device, or a combination thereof.

The secondary device assigns a new operating personality in accordance with the new power flow direction (812). For example, the secondary device's bidirectional manager assigns a new operating personality to respective controllers within the secondary device as appropriate to the new direction of power flow. The bidirectional power manager can assign the new operating personality by toggling a flag bit (e.g., TMN_SIDE discussed in more detail below) to indicate operation as a transmitter/inverter or operation as a receiver/rectifier.

In response to the new operating personality assignment, the various secondary device controllers can reconfigure their respective operations. For example, the controllers can load control algorithms (e.g., software code blocks) to perform operations according to the new power flow direction. For example, a TMN controller can reset a TMN and load control code for generating appropriate TMN control signals for operation in according to the new power flow direction. The TMN may need to adjust set points (e.g., impedance values, impedance adjustment step sizes, and/or protection schemes) to accommodate power transfer in the new direction or to prepare for power ramp up in the new direction or both. For example, power flow in a V2G mode may generally be lower than in a G2V mode, e.g., due to asymmetries between GA and VA side resonator coils and/or discharge constraints on a battery. Consequently, TMN and/or inverter-rectifier set points may be different for operating in a V2G mode vice a G2V mode.

The secondary device (e.g., the secondary device's inverter controller) can control the inverter-rectifier operation according to the new operating personality (814). For example, an inverter-rectifier controller can load appropriate algorithms for generating PWM control signals for operating as an inverter when the secondary device is a transmitter and operating as a rectifier when the secondary device is a receiver. The specific inverter and rectifier operations are described in more detail below in reference to FIGS. 9 and 10.

The secondary device sends a reply to the primary device indicating its reconfiguration status (816). When the secondary device indicates that its reconfiguration is still in progress or is stalled, the primary device waits and/or resends an instruction 808. By the primary device waiting for confirmation that the secondary device has completed updating its operating personality the process 800 may provide for safer and more robust operations. For example, it may prevent the power flow from commencing or reversing with mismatched personalities assigned to either the secondary or primary device. When the secondary device indicates that its reconfiguration is complete, the primary device reconfigures for operating in the opposite power flow direction from its current operations (818). For example, if the primary device was operating as a transmitter it will reconfigure for operation as a receiver. If the primary device was operating as a receiver it will reconfigure for operation as a transmitter. For example, the primary device's bidirectional manager can coordinate controller operations within the secondary device to shut down power flow in the present direction by, for example, securing operation of the inverter-rectifier, shifting switches to disconnect a load/power supply (as appropriate), toggling bypass switches to dissipate residual currents within the secondary device, or a combination thereof.

The primary device assigns a new operating personality in accordance with the new power flow direction (820). For example, the primary device's bidirectional manager assigns a new operating personality to respective controllers within the primary device as appropriate to the new direction of power flow. The bidirectional (power) manager can assign the new operating personality by toggling a flag bit (e.g., TMN_SIDE discussed in more detail below) to indicate operation as a transmitter/inverter or operation as a receiver/rectifier. In response to the new operating personality assignment, the various primary device controllers can reconfigure their respective operations. For example, the controllers can load control algorithms (e.g., software code blocks) to perform operations according to the new power flow direction. For example, a TMN controller can reset a TMN and load control code for generating appropriate TMN control signals for operation in according to the new power flow direction. The TMN may need to adjust set points (e.g., impedance values and/or protection schemes) to accommodate power transfer in the new direction or to prepare for power ramp up in the new direction or both.

The primary device (e.g., the primary device's inverter controller) can control the inverter-rectifier operation according to the new operating personality (822). For example, an inverter-rectifier controller can load appropriate algorithms for generating PWM control signals for operating as an inverter when the secondary device is a transmitter and operating as a rectifier when the secondary device is a receiver. In some implementations, a TMN controller in the primary device can control the TMN according to the new operating personality. For example, a TMN controller on the primary device can load appropriate control algorithms for generating TMN adjustment signals for operating as a load coupled TMN in a first direction, or a power supply coupled TMN in a second direction.

Figure 9:
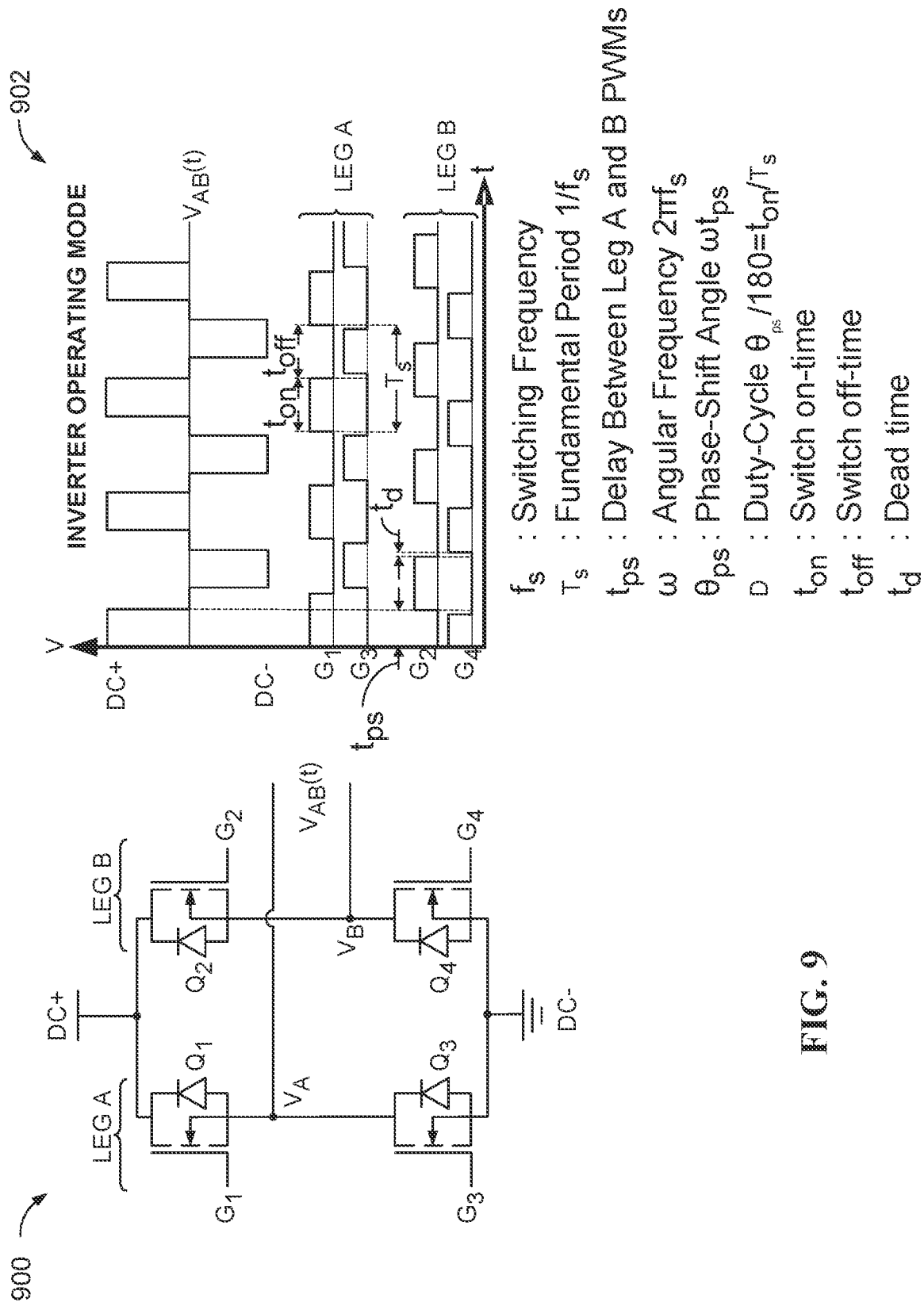
FIG. 9 is a schematic of an exemplary inverter-rectifier and a timing diagram illustrating operation of the inverter-rectifier in an inverter operating mode.

FIG. 9 depicts a schematic 900 of an exemplary inverter-rectifier 902 and a timing diagram 902 illustrating operation of the inverter-rectifier in an inverter operating mode. The schematic 1800 shows a phase shifted full-bridge inverter. The inverter bridge circuit uses active switching elements Q1, Q2, Q3, and Q4, which can be, for example, MOSFETs, transistors, FETs, IGBTs, etc.

The timing diagram 902 illustrates the driving signal pattern for the switches Q1, Q2, Q3, and Q4. The switches are grouped into two legs; Leg A (Q1, Q3) and Leg B (Q2, Q4). The corresponding switches in each leg are alternately switched on and off by respective PWM control signals. On time and off time, for each gate drive signal G1, G2, G3, and G4 are shown. The dead time td shown is when both gate drivers of the same leg are off. The off time may be larger than the on time for each driving signal in a period Ts.

The delay time tps between Leg A (Q1 and Q3) and Leg B (Q2 and Q4), when expressed in degrees, is known as the phase-shift angle and is a means for adjusting the overall power sourced by the inverter-rectifier when operating as an inverter. At start-up, output power VAB(t) from inverter-rectifier terminals VA and VB, can have an 11% duty cycle (leg phase-shift angle $\theta ps=20$ degrees). At max power, VAB(t) can be at a 100% duty cycle (leg phase $\theta ps=180$ degrees). Total power output is controlled by adjusting the delay time tPS between the Leg A and Leg B PWM signals.

In some embodiments, the inverter-rectifier 900 may be operated according to one or more active rectification methods (e.g., method 304, 402, 502, and/or 602) described herein. Although a full bridge inverter is shown, in some implementations the inverter-rectifier switches can be arranged in a half-bridge configuration. In some implementations, the inverter-rectifier can implement zero-voltage switching operations to ensure the switches are operated when the voltage across them is zero or near-zero.

Figure 10:
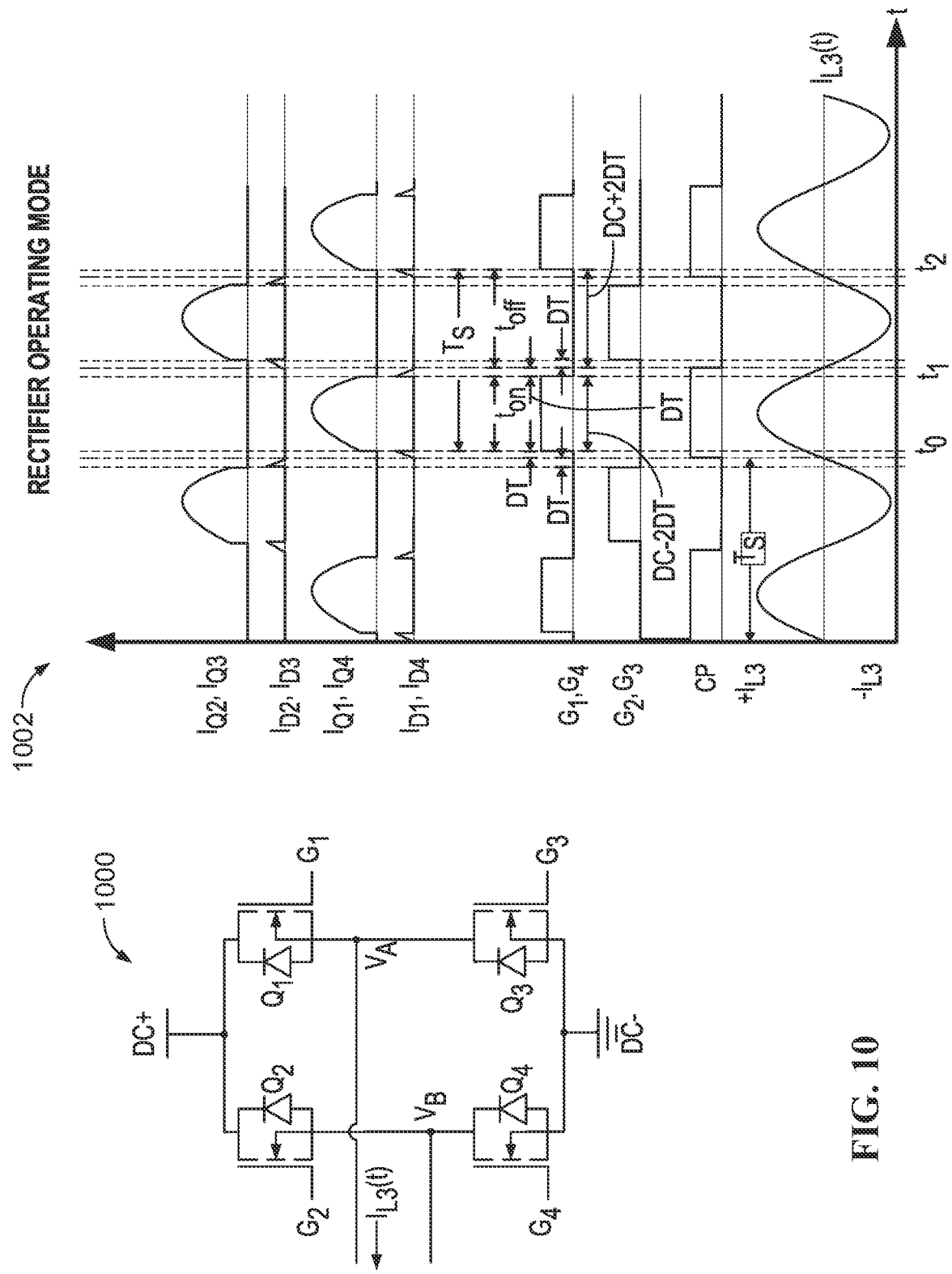
FIG. 10 is a schematic of an exemplary inverter-rectifier and a timing diagram illustrating operation of the inverter-rectifier in a rectifier operating mode.

FIG. 10 depicts a schematic 1000 of an exemplary inverter-rectifier and a timing diagram 1902 illustrating operation of the inverter-rectifier 702 in a rectifier operating mode. FIG. 10 illustrates a synchronous rectifier operation utilizing the same switches as shown in FIG. 9. The gate drive signals (G1, G2, G3, G4) corresponding to respective switches (Q1, Q2, Q3, Q4) are shown in the timing diagram 1902. Although zero current switching operation is shown, zero-voltage switching (ZVS) naturally follows the operation and can be used in some implementations. However, ZVS switching in active rectification mode is not shown in figures.

The synchronous rectifier can receive the zero-crossing of the I3s current (shown as I3d or I3s in FIG. 7) and creates the timing of the synchronous rectification (zero current switching) as shown in timing diagram 1002. In the rectifier mode, the inverter-rectifier 702 rectifies an AC input signal into a DC output signal by alternately switching on corresponding pairs of switches (Q1/Q4 and Q2/Q3). For example, the inverter-rectifier controller (e.g., inverter/protection and control circuitry) can receive I3d or I3s current and/or phase measurements from a current or phase sensor (e.g., sensor 218). The switches Q1, Q2, Q3, and Q4 can be turned off at the zero current (or near zero current) of the input to the inverter-rectifier 702, and an appropriate time delay td may be permitted to lapse before operating the next pair of switches (e.g., Q1 and Q4 or Q2 and Q3). This can prevent power losses within the switch. In some implementations, the time delay may be adjusted by the system as needed.

In some implementations, during a startup, the inverter-rectifier does not begin does not begin switching until the measured input power is above a threshold value that ensures continuous conduction of the I3d current. The threshold value can be, e.g., between 2 kW and 4 kW, and/or between 20-40% of a target power. During the low power operations below the threshold input power value, the input AC signal may be noisy, potentially resulting in inaccurate zero-crossing detections and possibly large transients for imprecise switching. For example, the I3d current that is used to generate the PWM synchronization may be discontinuous and noisy resulting in inaccurate zero-crossing detections and possibly large transients or even in a destructive shorting of the power stage. Instead, rectification can be performed passively when power is below the threshold value by conduction through the body-diodes of the switches. In such implementations, the switching operations performed above the threshold input power value can be considered an active rectification mode and the body-diode conduction below the threshold input power value can be considered a passive rectification mode.

In some embodiments, the inverter-rectifier 1000 may be operated according to one or more active rectification methods (e.g., method 304, 402, 502, and/or 602) described herein.

Hardware and Software Implementations

In some examples, some or all of the processing described above can be carried out on one or more centralized computing devices. In some examples, some types of processing occur on one device and other types of processing occur on another device. In some examples, some or all of the data described above can be stored in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

FIG. 11 is a block diagram of an example computer system 1100 that may be used in implementing the technology described in this document. General-purpose computers, network appliances, mobile devices, or other electronic systems may also include at least portions of the system 1100. The system 1100 includes a processor 1110, a memory 1120, a storage device 1130, and an input/output device 1140. Each of the components 1110, 1120, 1130, and 1140 may be interconnected, for example, using a system bus 1150. The processor 1110 is capable of processing instructions for execution within the system 1100. In some implementations, the processor 1110 is a single-threaded processor. In some implementations, the processor 1110 is a multi-threaded processor. The processor 1110 is capable of processing instructions stored in the memory 1120 or on the storage device 1130.

The memory 1120 stores information within the system 1100. In some implementations, the memory 1120 is a non-transitory computer-readable medium. In some implementations, the memory 1120 is a volatile memory unit. In some implementations, the memory 1120 is a non-volatile memory unit.

The storage device 1130 is capable of providing mass storage for the system 1100. In some implementations, the storage device 1130 is a non-transitory computer-readable medium. In various different implementations, the storage device 1130 may include, for example, a hard disk device, an optical disk device, a solid-date drive, a flash drive, or some other large capacity storage device. For example, the storage device may store long-term data (e.g., database data, file system data, etc.). The input/output device 1140 provides input/output operations for the system 1100. In some implementations, the input/output device 1140 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1160. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1130 may be implemented in a distributed way over a network, such as a server farm or a set of widely distributed servers, or may be implemented in a single computing device.

Although an example processing system has been described in FIG. 11, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for operating an inverter-rectifier of a bidirectional wireless power transmitter, the method comprising:
   determining a power flow direction of the bidirectional wireless power transmitter;
   controlling, in response to a determination that the power flow direction is a first power flow direction, the inverter-rectifier to operate in a rectifier mode;
   generating, during the rectifier mode, a zero-crossing signal representing one or more zero-crossings of a current at an input of the inverter-rectifier, wherein rising edges of the zero-crossing signal indicate zero-crossings corresponding to a rise in the current and falling edges of the zero-crossing signal indicate zero-crossings corresponding to a fall in the current;
   determining, during the rectifier mode, a first delay time based on at least one bidirectional wireless power transmitter parameter and the zero-crossing signal;
   generating, during the rectifier mode, first and second control signals for first and second switches of the inverter-rectifier, respectively, based on the first delay time and the rising and falling edges of the zero-crossing signal; and
   providing, during the rectifier mode, the first and second control signals to the first and second switches, respectively.

2. The method of claim 1, further comprising:
   inserting, during the rectifier mode, a first dead time between the first control signal and the second control signal.

3. The method of claim 1 further comprising:
   determining a second delay time based on the wireless power system parameter and the zero-crossing signal;
   generating third and fourth control signals for third and fourth switches of the inverter-rectifier, respectively, based on the second delay time and the rising and falling edges of the zero-crossing signal; and providing the third and fourth control signals to the third and fourth switches, respectively.

4. The method of claim 3, further comprising:
inserting, during the rectifier mode, a second dead time between the third control signal and the fourth control signal.

5. The method of claim 3 wherein the third and fourth switches are coupled to the first and second switches in a full-bridge configuration.

6. The method of claim 1, wherein the first and second switches are operated to provide DC power to a voltage bus of the bidirectional wireless power transmitter during the rectifier mode, the voltage bus being configured to provide the received DC power to one of a power source or a load.

7. The method of claim 1, further comprising:
controlling, in response to a determination that the power flow direction is a second power flow direction, the inverter-rectifier to operate in an inverter mode.

8. The method of claim 7, wherein the first and second switches are operated to provide AC power to at least one coil of the bidirectional wireless power transmitter during the inverter mode.

9. The method of claim 1, wherein determining the power flow direction of the bidirectional wireless power transmitter includes receiving an indication of the power flow direction from a controller of the bidirectional wireless power transmitter.

10. The method of claim 1, wherein determining the power flow direction of the bidirectional wireless power transmitter includes receiving an indication of the power flow direction from a wireless power receiver.

11. An inverter-rectifier of a bidirectional wireless power transmitter, the inverter-rectifier comprising:
a first switch and a second switch coupled to at least one coil of the bidirectional wireless power transmitter; and
a control system coupled to each of the first switch and the second switch, the control system configured to:
determine a power flow direction of the bidirectional wireless power transmitter;
control, in response to a determination that the power flow direction is a first power flow direction, the inverter-rectifier to operate in a rectifier mode;
generate, during the rectifier mode, a zero-crossing signal representing one or more zero-crossings of a current at an input of the inverter-rectifier, wherein rising edges of the zero-crossing signal indicate zero-crossings corresponding to a rise in the current and falling edges of the zero-crossing signal indicate zero-crossings corresponding to a fall in the current;
determine, during the rectifier mode, a first delay time based on at least one bidirectional wireless power transmitter parameter and the zero-crossing signal;
generate, during the rectifier mode, first and second control signals for first and second switches of the inverter-rectifier, respectively, based on the first delay time and the rising and falling edges of the zero-crossing signal; and
provide, during the rectifier mode, the first and second control signals to the first and second switches, respectively.

12. The inverter-rectifier of claim 11, wherein the control system is further configured to:
insert, during the rectifier mode, a first dead time between the first control signal and the second control signal.

13. The inverter-rectifier of claim 11, wherein the control system is further configured to:
determine a second delay time based on the wireless power system parameter and the zero-crossing signal;
generate third and fourth control signals for third and fourth switches of the inverter-rectifier, respectively, based on the second delay time and the rising and falling edges of the zero-crossing signal; and
provide the third and fourth control signals to the third and fourth switches, respectively.

14. The inverter-rectifier of claim 11, wherein the control system is further configured to:
insert, during the rectifier mode, a second dead time between the third control signal and the fourth control signal.

15. The inverter-rectifier of claim 11, wherein the third and fourth switches are coupled to the first and second switches in a full-bridge configuration.

16. The inverter-rectifier of claim 11, wherein the first and second switches are operated to provide DC power to a voltage bus of the of the bidirectional wireless power transmitter during the rectifier mode, the voltage bus being configured to provide the received DC power to one of a power source or a load.

17. The inverter-rectifier of claim 11, further comprising:
control, in response to a determination that the power flow direction is a second power flow direction, the inverter-rectifier to operate in an inverter mode.

18. The inverter-rectifier of claim 17, wherein the first and second switches are operated to provide AC power to the at least one coil during the inverter mode.

19. The inverter-rectifier of claim 11, wherein determining the power flow direction of the bidirectional wireless power transmitter includes receiving an indication of the power flow direction from a controller that is external to the control system of the inverter-rectifier.

20. The inverter-rectifier of claim 11, wherein determining the power flow direction of the bidirectional wireless power transmitter includes receiving an indication of the power flow direction from a wireless power receiver.

* * * * *